US011985420B2

(12) United States Patent
Asukabe et al.

(10) Patent No.: US 11,985,420 B2
(45) Date of Patent: May 14, 2024

(54) IMAGE PROCESSING DEVICE, IMAGE PROCESSING METHOD, PROGRAM, AND IMAGING DEVICE

(71) Applicant: Sony Group Corporation, Tokyo (JP)

(72) Inventors: Yuki Asukabe, Saitama (JP); Takahiro Kosugi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/433,079

(22) PCT Filed: Feb. 5, 2020

(86) PCT No.: PCT/JP2020/004374
§ 371 (c)(1),
(2) Date: Aug. 23, 2021

(87) PCT Pub. No.: WO2020/195198
PCT Pub. Date: Oct. 1, 2020

(65) Prior Publication Data
US 2022/0159190 A1    May 19, 2022

(30) Foreign Application Priority Data
Mar. 27, 2019  (JP) .................................. 2019-060386

(51) Int. Cl.
*H04N 23/67*     (2023.01)
*G03B 13/36*     (2021.01)
*G03B 17/18*     (2021.01)

(52) U.S. Cl.
CPC ........... *H04N 23/672* (2023.01); *G03B 13/36* (2013.01); *G03B 17/18* (2013.01)

(58) Field of Classification Search
CPC .......... H04N 5/232122; H04N 5/2226; H04N 5/232127; H04N 9/04557; H04N 5/23219;
(Continued)

(56) References Cited

U.S. PATENT DOCUMENTS

2008/0131019 A1*  6/2008  Ng .............................. G06T 5/20
                                                                  382/255
2013/0027587 A1*  1/2013  Matsui .................. H04N 5/2621
                                                                  348/241
(Continued)

FOREIGN PATENT DOCUMENTS

JP    2012-150224 A    8/2012
JP    2014-178643 A    9/2014
(Continued)

OTHER PUBLICATIONS

International Search Report (PCT/ISA/210), International Application No. PCT/JP2020/004374, dated Mar. 31, 2020.
(Continued)

*Primary Examiner* — Abdelaaziz Tissire
(74) *Attorney, Agent, or Firm* — Michael Best & Friedrich LLP

(57) ABSTRACT

An object is to cause a distribution of defocus amounts in a certain arbitrary region of a captured image to be displayed. A map data generation unit configured to generate defocus map data representing defocus amounts at a plurality of positions in a captured image obtained by an imaging element unit, calculated from phase difference information detected by a phase difference detection unit, and a display control unit configured to generate a defocus map image representing a distribution of defocus amounts of the captured image using the defocus map data generated by the map data generation unit and to perform display control are included.

18 Claims, 24 Drawing Sheets

(58) Field of Classification Search
CPC ....... H04N 5/232933; H04N 5/232945; H04N 5/36961; H04N 23/672; H04N 25/134; H04N 23/611; H04N 23/631; H04N 23/635; H04N 23/675; H04N 25/704; G03B 13/36; G03B 17/18; G03B 13/20; G02B 7/34–346

See application file for complete search history.

(56) References Cited

U.S. PATENT DOCUMENTS

| | | | | |
|---|---|---|---|---|
| 2013/0050430 A1* | 2/2013 | Lee | ...................... | H04N 13/128 |
| | | | | 348/46 |
| 2013/0088614 A1* | 4/2013 | Lee | ...................... | H04N 13/122 |
| | | | | 348/222.1 |
| 2014/0347541 A1* | 11/2014 | Okazaki | ................ | H04N 23/62 |
| | | | | 348/333.02 |
| 2015/0035855 A1* | 2/2015 | Kim | ...................... | H04N 5/2356 |
| | | | | 345/619 |
| 2015/0201121 A1* | 7/2015 | Nobayashi | ........... | H04N 23/672 |
| | | | | 348/222.1 |
| 2015/0244929 A1* | 8/2015 | Lee | ...................... | H04N 23/633 |
| | | | | 348/346 |
| 2016/0044268 A1* | 2/2016 | Oikawa | .............. | H04N 5/23219 |
| | | | | 348/208.6 |
| 2016/0119534 A1* | 4/2016 | Han | ...................... | H04N 23/63 |
| | | | | 348/345 |
| 2016/0241775 A1* | 8/2016 | Fukuda | ................ | G06K 9/6267 |
| 2017/0034421 A1* | 2/2017 | Yamazaki | ............. | H04N 23/80 |
| 2017/0064192 A1* | 3/2017 | Mori | .................... | H04N 23/632 |
| 2017/0223275 A1* | 8/2017 | Yanagisawa | ......... | H04N 25/704 |
| 2017/0223334 A1* | 8/2017 | Nobayashi | ........... | H04N 13/128 |
| 2017/0374269 A1* | 12/2017 | Govindarao | ......... | H04N 23/959 |
| 2018/0106982 A1* | 4/2018 | Uemura | ............... | H04N 23/675 |
| 2019/0028640 A1* | 1/2019 | Kanda | ....................... | G06T 3/20 |
| 2019/0243533 A1* | 8/2019 | Imamiya | ................ | G02B 7/346 |
| 2020/0104034 A1* | 4/2020 | Lee | ......................... | H04N 23/62 |
| 2020/0154056 A1* | 5/2020 | Mori | .................... | H04N 23/672 |
| 2020/0213511 A1* | 7/2020 | Suzuki | ................. | H04N 23/634 |
| 2021/0250517 A1* | 8/2021 | Mashimo | ............. | H04N 23/635 |

FOREIGN PATENT DOCUMENTS

| | | |
|---|---|---|
| JP | 2016-197177 A | 11/2016 |
| JP | 2016-197231 A | 11/2016 |
| JP | 2018-005008 A | 1/2018 |
| JP | 2018081534 A | 5/2018 |

OTHER PUBLICATIONS

Notification of Transmittal of the International Search Report and the Written Opinion of the International Searching Authority, or the Declaration (PCT/ISA/220), International Application No. PCT/JP2020/004374, dated Apr. 21, 2020.

Written Opinion of the International Search Authority (PCT/ISA/237), International Application No. PCT/JP2020/004374, dated Apr. 21, 2020.

* cited by examiner

Fig. 7

■ DEFOCUS MAP DATA

|  | X1 | X2 | X3 | ... |
|---|---|---|---|---|
| Y1 | DF1 | DF2 | DF3 | ... |
| Y2 | DF4 | DF5 | DF6 | ... |
| Y3 | DF7 | DF8 | DF9 | ... |
| ⋮ | ⋮ | ⋮ | ⋮ | |

X-AXIS COORDINATES (columns), Y-AXIS COORDINATES (rows)

VALUE OF DEFOCUS AMOUNT

Fig. 8

■ DEPTH MAP DATA

|  | X1 | X2 | X3 | ... |
|---|---|---|---|---|
| Y1 | DP1 | DP2 | DP3 | ... |
| Y2 | DP4 | DP5 | DP6 | ... |
| Y3 | DP7 | DP8 | DP9 | ... |
| ⋮ | ⋮ | ⋮ | ⋮ | |

X-AXIS COORDINATES (columns), Y-AXIS COORDINATES (rows)

VALUE OF SUBJECT DISTANCE

IMAGE PROCESSING DEVICE, IMAGE PROCESSING METHOD, PROGRAM, AND IMAGING DEVICE

TECHNICAL FIELD

The present technology relates to an image processing device, an image processing method, a program, and an imaging device.

BACKGROUND ART

There are technology regarding autofocusing for automatically focusing a focus lens on a certain arbitrary point position on a captured image and technology regarding F value control for automatically controlling the quantity of light of an imaging surface.

PTL 1 below discloses an imaging device that displays information about a defocus amount at a certain arbitrary point position when a focus lens is focused on the point position through a manual operation.

CITATION LIST

Patent Literature

[PTL 1]
JP 2016-197231 A

SUMMARY

Technical Problem

However, although only a defocus amount of a certain arbitrary point position may be checked and focus control may be performed when a focus lens is focused on the point position, in a case where the point position is intentionally defocused as an expression technique of imaging, for example, it is impossible to smoothly perform focus control in which an intention of a person who performs imaging is reflected because a relationship between a defocus amount of each position of a captured image and the defocus amount of the point position cannot be ascertained.

Accordingly an object of the present technology is to display a distribution of defocus amounts in a certain arbitrary region of a captured image.

Solution to Problem

An image processing device according to the present technology includes a map data generation unit configured to generate defocus map data representing defocus amounts at a plurality of positions in a captured image obtained by an imaging element unit, calculated from phase difference information detected by a phase difference detection unit, and a display control unit configured to generate a defocus map image representing a distribution of defocus amounts of the captured image using the defocus map data generated by the map data generation unit and to perform display control.

Accordingly the distribution of the defocus amounts at the plurality of positions in the captured image is displayed as the defocus map image.

In the above-described image processing device according to the present technology, the phase difference detection unit detects the phase difference information using image surface phase difference pixels in the imaging element unit.

Accordingly, defocus amounts are calculated using the phase difference information detected by the image face phase difference pixels in the imaging element unit.

In the above-described image processing device according to the present technology, it is conceivable that the map data generation unit generates defocus map data of a plurality of positions in a target region set in the captured image and the display control unit generates a defocus map image with respect to the target region.

Accordingly a distribution of defocus amounts at the plurality of positions in the target region of the captured image is displayed as the defocus map image.

In the above-described image processing device according to the present technology, it is conceivable that the map data generation unit calculates subject distances at a plurality of positions in the captured image obtained by the imaging element unit on the basis of the calculated defocus amounts and generates depth map data representing the calculated subject distances, and the display control unit generates a depth map image representing a distribution of the subject distances in the captured image using the depth map data generated by the map data generation unit and performs display control.

Accordingly, the distribution of the subject distances in the captured image is displayed as the depth map image. In addition, the depth map image and the defocus map image may be switchably displayed.

In the above-described image processing device according to the present technology, it is conceivable that the display control unit generates a defocus map image colored depending on the defocus amounts at the respective positions in the captured image.

Accordingly, a defocus amount value difference at each position in the captured image is displayed as a color difference in the defocus map image.

In the above-described image processing device according to the present technology, it is conceivable that the display control unit generates a defocus map image using a defocus amount display icon having different display modes in response to defocus amounts.

Accordingly, a distribution of defocus amounts at positions corresponding to respective defocus amount display icons is displayed in display modes of the defocus amount display icons in the defocus map image.

In the above-described image processing device according to the present technology it is conceivable that the defocus amount display icon is formed in an annular shape and the diameter of the defocus amount display icon is changed in response to a defocus amount.

Accordingly, annular defocus amount display icons having different diameters in response to defocus amounts are displayed.

In the above-described image processing device according to the present technology it is conceivable that the display control unit performs control of causing the defocus map image to be displayed upon switching to a focused state by a focus control operation in an autofocus mode.

Accordingly, distributions of defocus amounts at a focusing position and in a region other than the focusing position are displayed as the defocus map image.

In the above-described image processing device according to the present technology, it is conceivable that the display control unit performs control of causing the defocus map image to be displayed upon detection of a focus adjustment operation or an aperture adjustment operation by a user in a manual focus mode.

Accordingly, the focus adjustment operation or the aperture adjustment operation by the user is performed in a state in which the defocus map image representing a distribution of defocus amounts in the captured image is displayed.

In the above-described image processing device according to the present technology, it is conceivable that the display control unit performs control of causing the defocus map image to be displayed upon start of recording of the captured image.

Accordingly, change in a distribution of defocus amounts of the captured image during recording of the captured image (captured moving image) is displayed by the defocus map image.

In the above-described image processing device according to the present technology, it is conceivable that a first image output for causing the captured image to be displayed without displaying the defocus map image and a second image output for causing the captured image including display of the defocus map image to be displayed are performed.

Accordingly, the defocus map image is not displayed on an output apparatus that has received the first image output and the defocus map image is displayed on an output apparatus that has received the second image output.

The output apparatuses mentioned here are apparatuses including the image processing device built therein and is, for example, imaging devices such as a digital still camera and a digital video camera. Further, the output apparatuses may be display apparatuses that display images on the basis of image signals output from an apparatus including the image processing device built therein.

In the above-described image processing device according to the present technology, it is conceivable that the display control unit ends display control of the defocus map image after the elapse of a predetermined time from start of display control of the defocus map image.

Accordingly, display control of the defocus map image ends without causing display control of the defocus map image to end by a user operation.

In the above-described image processing device according to the present technology, it is conceivable that a target region setting unit that sets a region in the captured image designated by a user operation as the target region is included.

Accordingly, a defocus map image is displayed in the region in the captured image designated by the user operation.

In the above-described image processing device according to the present technology, it is conceivable that the target region setting unit that sets the target region depending on the contents of the captured image is included. Accordingly a defocus map image is displayed in the target region depending on the contents of the captured image.

In the above-described image processing device according to the present technology, it is conceivable that the target region setting unit sets a face region detected in the captured image as the target region.

Accordingly the defocus map image is displayed in the face region in the captured image.

In the above-described image processing device according to the present technology, it is conceivable that the target region setting unit sets a pupil region detected in the captured image as the target region.

Accordingly, the defocus map image is displayed in the pupil region in the captured image.

In the above-described image processing device according to the present technology, it is conceivable that a recording control unit that records the defocus map data generated by the map data generation unit as additional information for the captured image is included.

Accordingly, defocus amount information at each position in the captured image is recorded as metadata of the captured image.

An imaging device according to the present technology includes at least the aforementioned map data generation unit and display control unit.

An image processing method according to the present technology includes generating defocus map data representing defocus amounts at a plurality of positions in a captured image obtained by an imaging element unit, calculated from phase difference information detected by a phase difference detection unit, and generating a defocus map image representing a distribution of defocus amounts of the captured image using the generated defocus map data and performing display control.

The program according to the present technology is a program that causes an information processing device to execute processing corresponding to such an image processing method.

BRIEF DESCRIPTION OF DRAWINGS

FIG. 7 is an illustrative diagram of defocus map data of the embodiment.

FIG. 8 is an illustrative diagram of depth map data of the embodiment.

DESCRIPTION OF EMBODIMENTS

Figure 1:
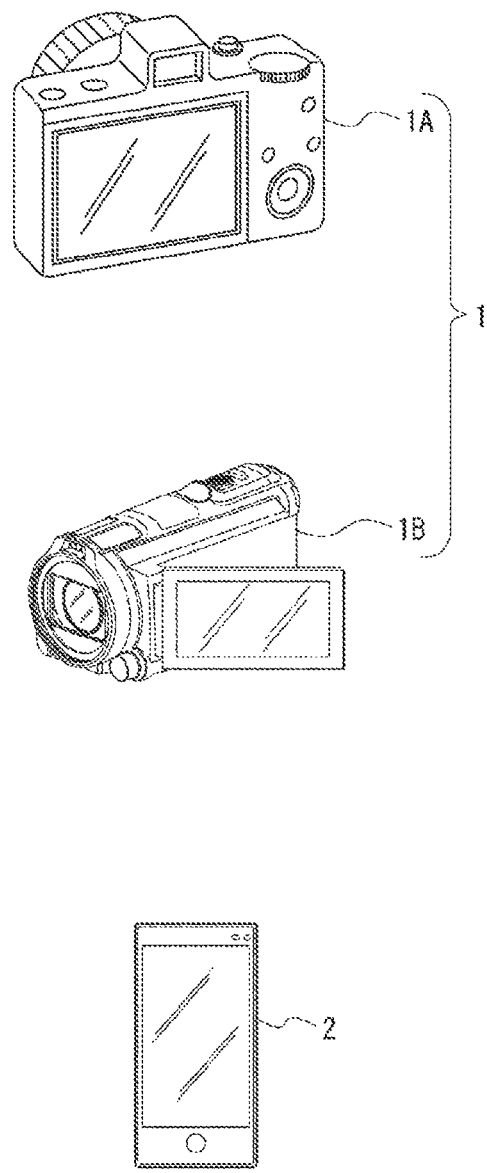
FIG. 1 is an illustrative diagram of apparatuses used in an embodiment of the present technology.

Hereinafter, embodiments will be described in the following order.

<1. Configuration of apparatus applicable as image processing device>
<2. Configuration of imaging device>
<3. Map image display mode and imaging operation control>
<4. Processing executed by image processing device>
<5. Conclusion and modified examples>

Meanwhile, in the following description, the same parts will be denoted by the same reference numerals and description thereof will be omitted.

In addition, the meaning of each term to be used is as follows.

Defocus map data represents a defocus amount of each position in a captured image or a target region in the captured image. A defocus amount quantitatively indicates a defocus (blur) state at a certain position in a captured image and, for example, corresponds to a diameter of a defocus circle.

Depth map data represents a subject distance at each position in a captured image or a target region in the captured image, A subject distance is a distance from a certain position in a captured image to a focus lens.

A defocus map data image is an image representing a distribution of defocus amounts in a captured image or a target region in the captured image, which is generated using defocus map data.

A depth map data image is an image representing a distribution of subject distances in a captured image or a target region in the captured image, which is generated using depth map data.

In the following description, defocus, map data and depth map data will be combined and denoted as map data, and a defocus map image and a depth map image will be combined and denoted as a map image.

<1. Configuration of Apparatus Applicable as Image Processing Device>

Although an example in which an image processing device according to the present disclosure is realized mainly by an imaging device will be described hereinafter, the image processing device can be realized in various apparatuses.

An apparatus to which the technology of the present disclosure can be applied will be described. FIG. 1 illustrates examples of apparatuses that can serve as an image processing device.

An imaging device 1 such as a digital still camera 1A or a digital video camera 1B and a mobile terminal 2 such as a smartphone are assumed as apparatuses that can serve as an image processing device.

For example, in the imaging device 1, a microcomputer or the like inside the imaging device 1 performs image processing. That is, the imaging device 1 performs image processing on an image file generated through imaging and thus can perform image output and imaging operation control based on an image processing result. A captured image is displayed on the imaging device 1 according to output image data.

The mobile terminal 2 also has an imaging function and performs the aforementioned image processing on an image file generated through imaging and thus can perform image output and imaging operation control based on an image processing result. A captured image is displayed on the mobile terminal 2 according to output image data.

Further, the present technology is not limited to the imaging device 1 and the mobile terminal 2, and various other apparatuses that can serve as an image processing device can be conceived.

Figure 2:
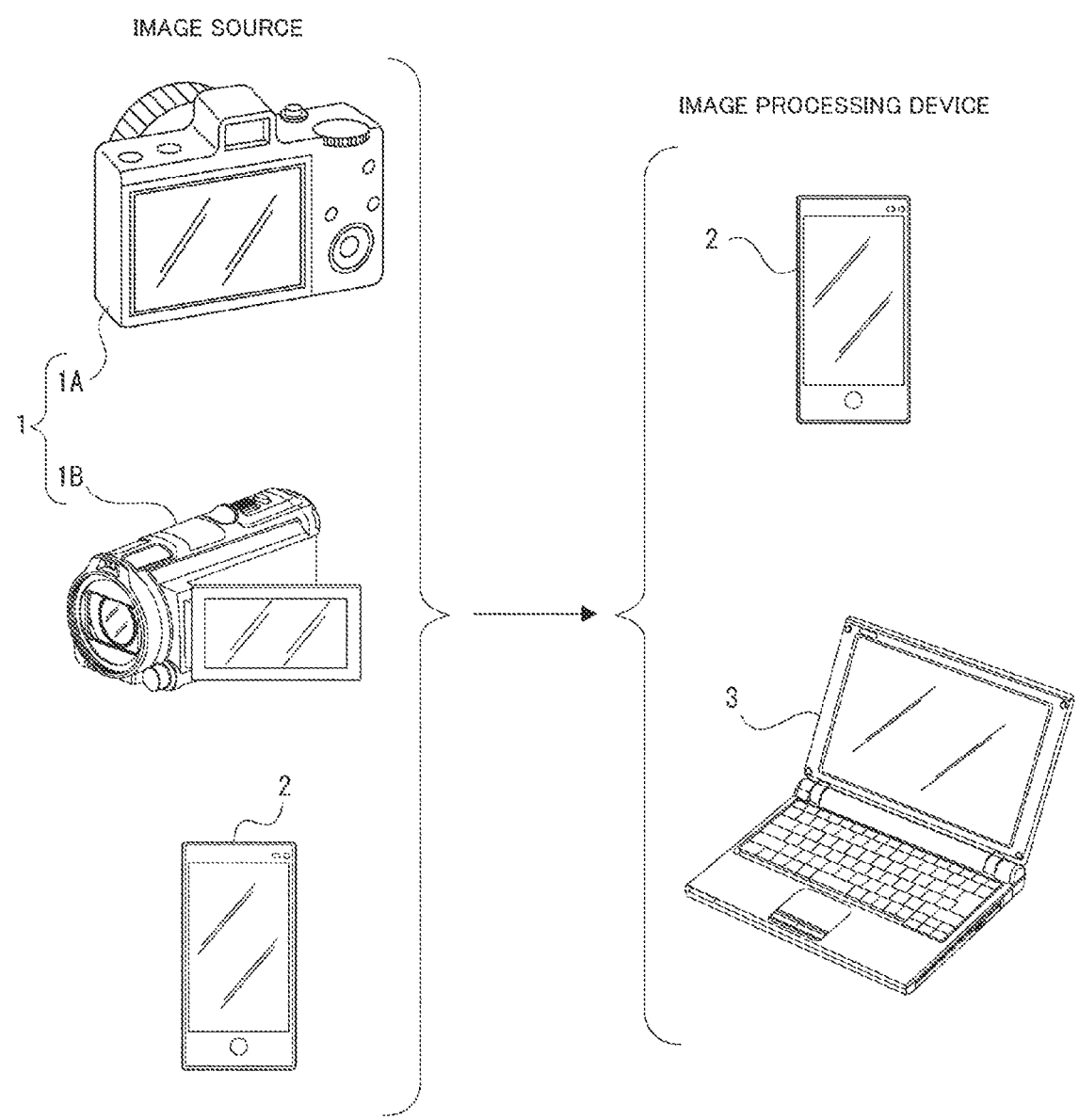
FIG. 2 is an illustrative diagram of apparatuses used in the embodiment.

FIG. 2 illustrates examples of apparatuses that can serve as an image source and apparatuses that can serve as an image processing device that acquires an image file from the image source.

The imaging device 1, the mobile terminal 2, and the like are assumed as apparatuses that can serve as an image source. The mobile terminal 2, a personal computer 3, and the like are assumed as apparatuses that can serve as an image processing device.

The imaging device 1 or the mobile terminal 2 as an image source transfers an image file obtained through moving image capturing to the mobile terminal 2 or the personal computer 3 as an image processing device via wired communication or wireless communication.

The mobile terminal 2 or the personal computer 3 as an image processing device can perform the aforementioned image processing on the image file acquired from the aforementioned image source.

Further, a certain mobile terminal 2 or personal computer 3 may serve as an image source for another mobile terminal 2 or personal computer 3 that functions as an image processing device.

A captured image is displayed on the mobile terminal 2 or the personal computer 3 as an image processing device according to image output based on the image processing result.

Further, the mobile terminal 2 or the personal computer 3 as an image processing device can also transfer an image file obtained from the aforementioned image processing result to the imaging device 1 or the mobile terminal 2 as an image source via wired communication or wireless communication and display a captured image on the imaging device 1 or the mobile terminal 2.

Although there are various devices and image sources functioning as the image processing device of the embodiment as described above, an example in which the imaging device 1 is realized as the image processing device will be described hereinafter.

<2. Configuration of Imaging Device>

A configuration example of the imaging device 1 as an image processing device will be described with reference to FIG. 3.

Further, an image file captured by the imaging device 1 may be transferred to the mobile terminal 2 or the personal computer 3 as an image processing device via wired communication or wireless communication, and the mobile terminal 2 or the personal computer 3 to which the image file has been transmitted may perform image processing, as described with reference to FIG. 2.

Figure 3:
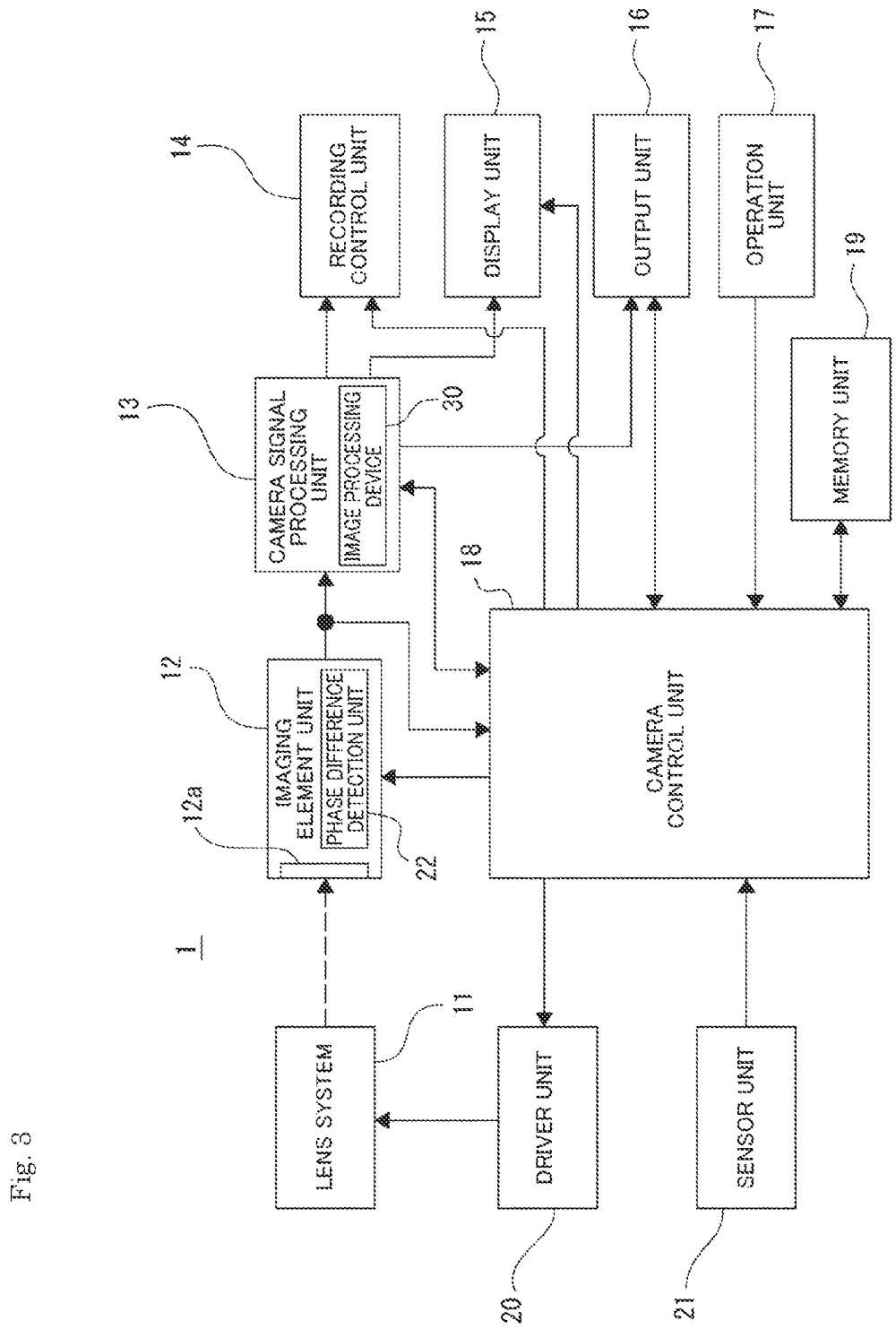
FIG. 3 is a block diagram of an imaging device of the embodiment.

As illustrated in FIG. 3, the imaging device 1 includes a lens system 11, an imaging element unit 12, a camera signal processing unit 13, a recording control unit 14, a display unit 15, an output unit 16, an operation unit 17, a camera control unit 18, a memory unit 19, a driver unit 20, a sensor unit 21, and a phase difference detection unit 22.

The lens system 11 includes lenses such as a cover lens, a zoom lens, and a focus lens, and an aperture mechanism. Light (incident light) from a subject is guided by the lens system 11 and condensed on the imaging element unit 12.

A motor driver for a zoom lens drive motor, a motor driver for a focus lens drive motor, a motor driver for an aperture mechanism drive motor, and the like, for example, are provided in the driver unit 20.

The driver unit 20 applies a drive current to the corresponding driver in response to an instruction from the camera control unit 18 or the camera signal processing unit 13 to execute movement of the focus lens and the zoom lens, opening and closing of aperture blades of the aperture mechanism, and the like.

The aperture mechanism is driven by the aperture mechanism drive motor to control the quantity of incident light on the imaging element unit 12 which will be described later. The focus lens is driven by the focus lens drive motor and used for focus control. The zoom lens is driven by the zoom lens drive motor and used for zoom control.

The imaging element unit 12 includes, for example, an image sensor 12a (an imaging element), such as a complementary metal oxide semiconductor (CMOS) type or charge coupled device (CCD) type. The image sensor 12a includes imaging pixels for capturing an image of a subject and image surface phase difference pixels for detecting a phase difference of an image of light of the subject.

The imaging element unit 12 executes, for example, correlated double sampling (CDS) processing, automatic gain control (AGC) processing, and the like on an electric signal obtained by photoelectric conversion of light received by the image sensor 12a, and further performs analog/digital (A/D) conversion processing. The imaging element unit 12 outputs an imaging signal as digital data to the camera signal processing unit 13 and the camera control unit 18.

The phase difference detection unit 22 detects phase difference information used to calculate a defocus amount. The phase difference detection unit 22 is, for example, image surface phase difference pixels in the imaging element unit 12. The image surface phase difference pixels (phase difference detection unit 22) detect a pair of phase difference signals, and the imaging element unit 12 outputs the pair of phase difference signals detected by the image surface phase difference pixels. These phase difference signals are used for a correlation operation for calculating a defocus amount.

The imaging element unit 12 outputs the phase difference signals to the camera signal processing unit 13 and the camera control unit 18.

Figure 4:
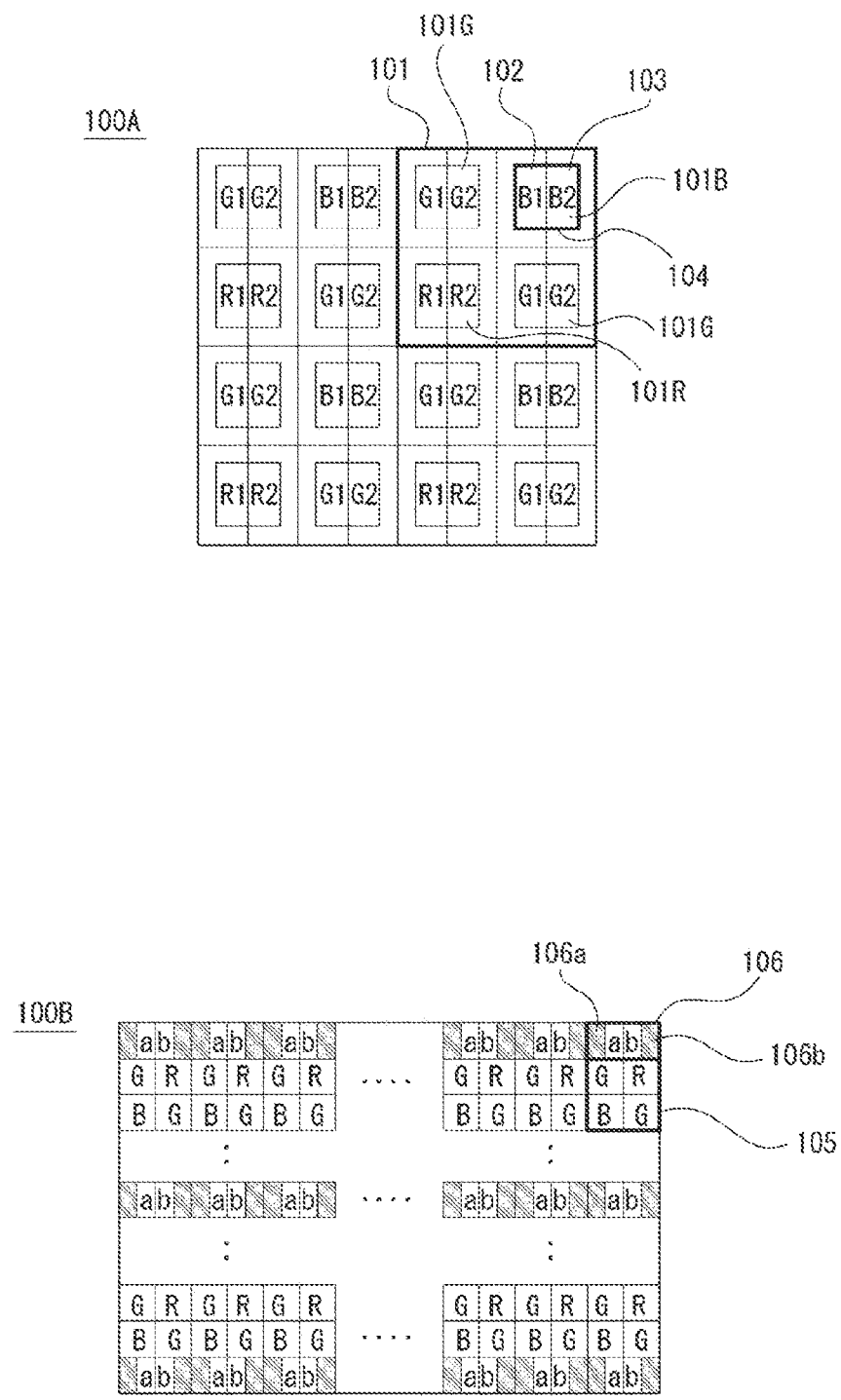
FIG. 4 is an illustrative diagram of an image element unit of the embodiment.

FIG. 4 illustrates an example of a pixel arrangement of the image sensor 12a (imaging element) in the present technology.

FIG. 4 illustrates parts of pixel arrangements of imaging elements 100A and 100B as an example of a pixel arrangement of the image sensor 12a (imaging element), The imaging element 100A is an example of forming functions of an imaging pixel and an image surface phase difference pixel as one pixel.

A plurality of pixel groups 101 including pixels in 2 columns×2 rows are provided in on imaging surface of the imaging element 100A. The pixel groups 101 are covered with color filters in a Bayer arrangement, and a pixel 101R having spectral sensitivity of R is disposed at a lower left position, a pixel 101G having spectral sensitivity of G is disposed at upper left and lower right positions, and a pixel 101B having spectral sensitivity of B is disposed at an upper right position in each pixel group 101.

In the imaging element 100A, each pixel holds a plurality of photodiodes (photoelectric conversion units) for one micro-lens 104 in order to detect a phase difference signal. Each pixel has two photodiodes 102 and 103 arranged in 2 columns×1 row.

The imaging element 100A allows acquisition of an imaging signal and a phase difference signal by a plurality of pixel groups 101 including pixels in 2 columns×2 rows (photodiodes in 4 columns×2 rows) being displayed on the imaging surface.

In each pixel, a light flux is separated by the micro-lens 104 and imaged on the photodiodes 102 and 103. Then, an imaging signal and a phase difference signal are read according to signals from the photodiodes 102 and 103.

In addition, the imaging element is not limited to the aforementioned configuration in which all pixels have a plurality of photodiodes, and image surface phase difference pixels may be discretely provided separately from imaging pixels of R, G, and B in pixels as represented in the imaging element 100B.

An imaging pixel groups 105 including imaging pixels in 2 columns×2 rows for capturing an image of a subject and a pair of image surface phase difference pixels 106 for detecting a phase difference of an image of light of the subject are provided on the imaging surface of the imaging element 100B. The pair of image surface phase difference pixels 106 are discretely disposed between a plurality of imaging pixels on the imaging surface.

When a pupil region of an imaging lens is divided into two left and right sub-divided regions, for example, a phase difference detection pixel 106a that receives a light flux incident from the left divided region and a phase difference detection pixel 106b that receives a light flux incident from the right divided region are provided in the pair of phase difference detection pixels 106. A phase difference signal of an image of a subject for each divided region, obtained from the phase difference detection pixel 106a and the phase difference detection pixel 106b, can be read.

With respect to regions in which the phase difference detection pixels 106 are not provided, the camera signal processing unit 13 complements a phase difference with respect to each position by executing superresolution processing according to image processing of machine learning or the like.

The imaging pixel group 105 is covered with color filters in a Bayer arrangement, and an imaging signal can be read from an electric signal obtained by photoelectric conversion of light received by the imaging pixel group 105.

As described above, since image surface phase difference pixels are formed integrally with R, G, and B imaging pixels or disposed around the R, G, and B imaging pixels, and thus a defocus amount can be precisely calculated from a read phase difference signal in a pixel unit of several μm.

Further, the phase difference detection unit 22 may be a phase difference sensor provided separately from the imaging element unit 12. For example, a configuration in which a ray of light guided from the lens system 11 of the imaging device 1 is divided into transmitted light toward the imaging element unit 12 and reflected light toward the phase difference sensor by passing a translucent mirror, and the phase difference sensor detects phase difference information by receiving the divided reflected light may be assumed.

Referring back to FIG. 3, the camera signal processing unit 13 is configured as an image processing processor by, for example, a digital signal processor (DSP). An image processing device 30 is provided in the camera signal processing unit 13 and executes processing which will be described later.

The camera signal processing unit 13 performs various types of signal processing on a digital signal (a captured image signal) from the imaging element unit 12. For example, the camera signal processing unit 13 performs preprocessing, synchronization processing, YC generation processing, various types of correction processing, resolution conversion processing, codec processing, and the like.

In the preprocessing, clamping processing for clamping black levels of R, G, and B to a predetermined level, processing for correction between the color channels of R, G, and B, or the like is performed on the captured image signal from the imaging element unit 12.

In the simultaneous processing, color separation processing is performed so that image data for each pixel has all color components of R, G, and B. For example, in the case of an imaging element using color filters in a Bayer array, demosaic processing is performed as the color separation processing.

In the YC generation processing, a luminance (Y) signal and a color (C) signal are generated (separated) from image data of R, G, and B.

In the resolution conversion processing, resolution conversion processing is executed for the image data subjected to various types of signal processing.

In the codec processing in the camera signal processing unit 13, coding processing for recording or communication, and file generation, for example, are performed on the image data subjected to the aforementioned various types of processing. For example, generation of an image file MF in an MP4 format used for recording an MPEG-4 compliant moving image/audio is performed. In addition, it is also conceivable to perform generation of a file in a format such as Joint Photographic Experts Group (JPEG), Tagged Image File Format (TIFF), or Graphics Interchange Format (GIF) as a still image file.

Further, the camera signal processing unit 13 also performs generation of metadata to be added to the image file using information from the camera control unit 18, or the like.

Further, although an audio processing system is not illustrated in FIG. 3, in fact, an audio recording system and an audio processing system are included, and the image file may include audio data together with image data as a moving image.

The recording control unit 14 performs, for example, recording and reproduction on a recording medium using a non-volatile memory. The recording control unit 14 performs processing of recording the image file such as moving image data or still image data, a thumbnail image, a generated defocus map data, or the like on the recording medium, for example.

An actual form of the recording control unit 14 can be considered in various ways. For example, the recording control unit 14 may be configured as a flash memory and a writing/reading circuit thereof built into the imaging device 1, or may be in the form of a card recording and reproduction unit that performs recording and reproduction access for a recording medium that can be attached to and detached from the imaging device 1, for example, a memory card (portable flash memory, or the like). Further, the recording control unit 14 may be realized as a hard disk drive (HDD) or the like as a form built into the imaging device 1.

The display unit 15 is a display unit that performs various displays to a person who performs imaging, and is, for example, a display panel or a viewfinder using on a display device such as a liquid crystal panel (LCD: Liquid Crystal Display) or an organic electro-luminescence (EL) display disposed in a housing of the imaging device 1.

The display unit 15 causes various displays to be executed on a display screen on the basis of an instruction of the camera control unit 18.

For example, image data of a captured image of which a resolution has been converted for a display by the camera signal processing unit 13 may be supplied to the display unit 15, and the display unit 15 may perform a display on the basis of the image data of the captured image in response to an instruction from the camera control unit 18. Accordingly, so-called a through image (a monitoring image of a subject), which is a captured image during standby, is displayed. In addition, the display unit 15 causes the recording control unit 14 to display a reproduced image of the image data read from the recording medium. The display unit 15 causes a display of various operation menus, icons, messages, or the like, that is, a graphical user interface (GUI) to be executed on the screen on the basis of an instruction of the camera control unit 18.

The output unit 16 performs data communication or network communication with an external apparatus by wire or wirelessly.

For example, captured image data (still image file or moving image file) is transmitted and output to an external display device, recording device, reproduction device, or the like.

Further, the output unit 16 is a network communication unit, and may perform communication based on various networks such as the Internet, a home network, and a local area network (LAN), and perform transmission or reception of various pieces of data to or from a server, a terminal, or the like on the network.

The operation unit 17 collectively indicates an input device allowing a user to perform various operation inputs. Specifically, the operation unit 17 indicates various operators (keys, a dial, a touch panel, a touch pad, or the like) provided in the housing of the imaging device 1.

The operation of the user is detected by the operation unit 17, and a signal according to the input operation is sent to the camera control unit 18.

The camera control unit 18 is configured as a microcomputer (arithmetic processing device) including a central processing unit (CPU).

The memory unit 19 stores information or the like that the camera control unit 18 uses for processing. As the illustrated memory unit 19, for example, a read only memory (ROM), a random access memory (RAM), a flash memory, and the like are comprehensively shown.

The memory unit 19 may be a memory area built in the microcomputer chip serving as the camera control unit 18, or may be configured as a separate memory chip.

The camera control unit 18 executes a program stored in a ROM, a flash memory, or the like of the memory unit 19 to control the entire imaging device 1.

For example, the camera control unit 18 controls operations of respective necessary units with respect to control of a shutter speed of the imaging element unit 12, an instruction for various types of signal processing in the camera signal processing unit 13, acquisition of lens information, an imaging operation or a recording operation according to a user operation, control of startlend of moving image recording, an operation of reproducing recorded image files, switching between autofocus (AF) control and manual focus (MF) control, an operation of the lens system 11 such as zooming, focusing, and aperture adjustment in a lens barrel, and an operation of a user interface.

A RAM in the memory unit 19 is used for temporary storage of data, programs, and the like as a work area when various types of data processing of the CPU of the camera control unit 18 are performed.

The ROM or a flash memory (a nonvolatile memory) in the memory unit 19 is used for storage of an operating system (OS) allowing the CPU to control each unit, content files such as image files, application programs for various operations, firmware, and the like.

The sensor unit 21 comprehensively indicates various sensors mounted in the imaging device 1. For example, a position information sensor, an illuminance sensor, an acceleration sensor, and the like may be mounted as the sensor unit 21.

The above-described imaging device 1 performs image processing on an image file generated through imaging.

Figure 5:
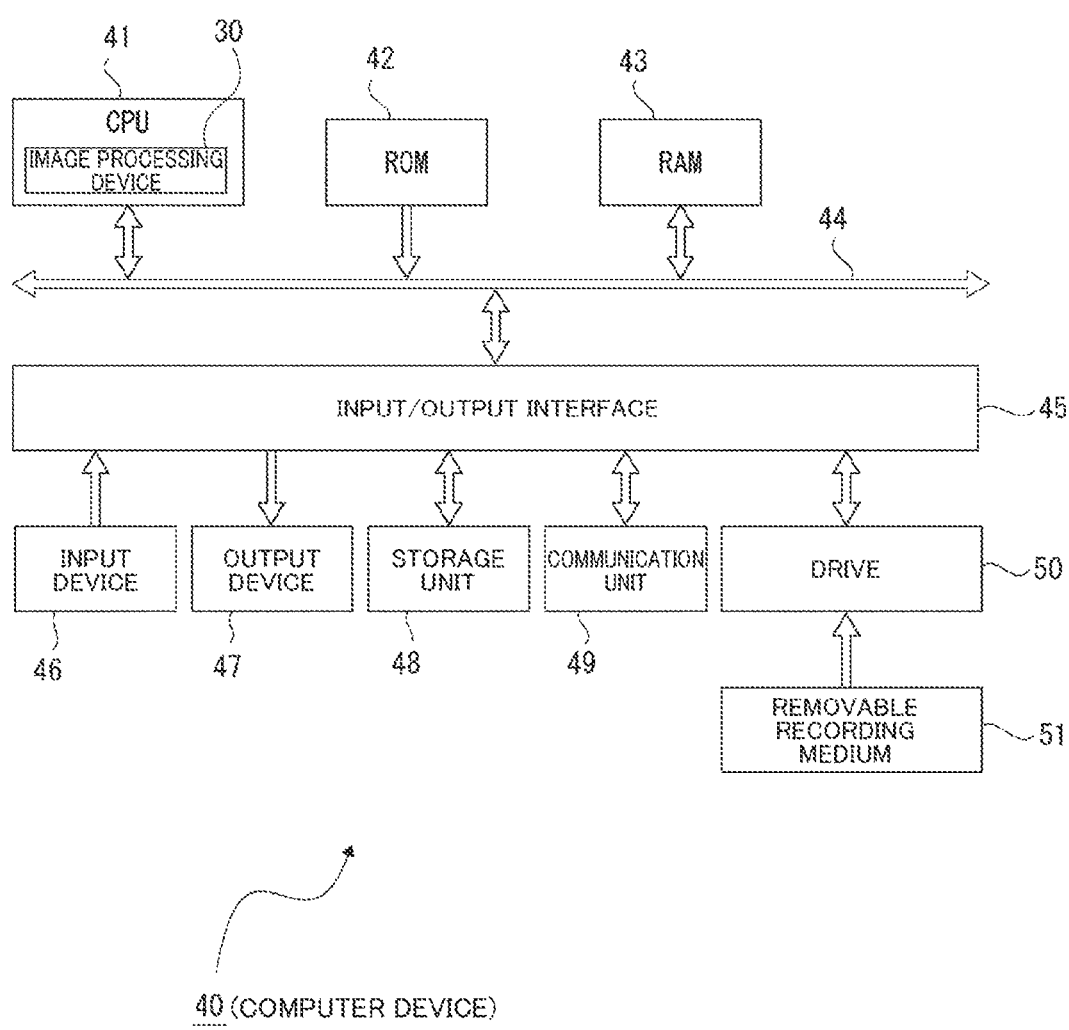
FIG. 5 is a block diagram of a computer device of the embodiment.

In addition, when the mobile terminal 2 or the personal computer 3 performs image processing, it can be realized as, for example, a computer device 40 having a configuration illustrated in FIG. 5.

In FIG. 5, a central processing unit (CPU) 41 of the computer device 40 executes various types of processing according to a program stored in a read only memory (ROM) 42 or a program loaded from a storage unit 48 to a random access memory (RAM) 43. Further, the RAM 43 also appropriately stores data and the like necessary for the CPU 41 to execute various types of processing. The image processing device 30 is provided in the CPU 41.

The CPU 41, the ROM 42, and the RAM 43 are connected to each other via a bus 44. An input/output interface 45 is also connected to the bus 44.

An input device 46 such as a keyboard, a mouse, and a touch panel, an output device 47 including a display such as a liquid crystal display (LCD), a cathode ray tube (CRT), or an organic electroluminescence (EL) panel, and a speaker or the like, and a hard disk drive (HDD) are connected to the input/output interface 45.

For example, the output device 47 executes a display of various images for image processing, a moving image that is a processing target, and the like on the display screen on the basis of an instruction of the CPU 41. In addition, the output device 47 displays various operation menus, icons, messages, or the like, that is, a graphical user interface (GUI) on the basis of an instruction of the CPU 41.

A storage unit 48 configured as a hard disk, a solid-state memory, or the like, and a communication unit 49 configured as a modem or the like may be connected to the input/output interface 45.

The communication unit 49 performs communication processing via a transmission path such as the Internet, and performs communication with various apparatuses using wired/wireless communication, bus communication, or the like.

A drive 50 is also connected to the input/output interface 45 as necessary, and a removable recording medium 51 such as a magnetic disk, an optical disc, a magneto-optical disc, or a semiconductor memory is appropriately mounted in the drive 50.

Using the drive 50, it is possible to read a data file such as an image file, various computer programs, and the like from the removable recording medium 51. The read data file is stored in the storage unit 48 or an image or audio included in the data file is output through the output device 47. Further, a computer program or the like read from the removable recording medium 51 is installed in the storage unit 48 as necessary.

In this computer device 40, for example, software for image processing in the image processing device of the present disclosure can be installed via network communication using the communication unit 49 or via the removable recording medium 51. Alternatively the software may be stored in the ROM 42, the storage unit 48, or the like in advance.

Meanwhile, the computer device 40 is not limited to a stand-alone configuration as illustrated in FIG. 5, and a plurality of computer devices may be configured as a system. The plurality of computer devices may include computer devices as a server group (cloud) that can be used for a cloud computing service.

A functional configuration of the image processing device 30 will be described with reference to FIG. 6.

Figure 6:
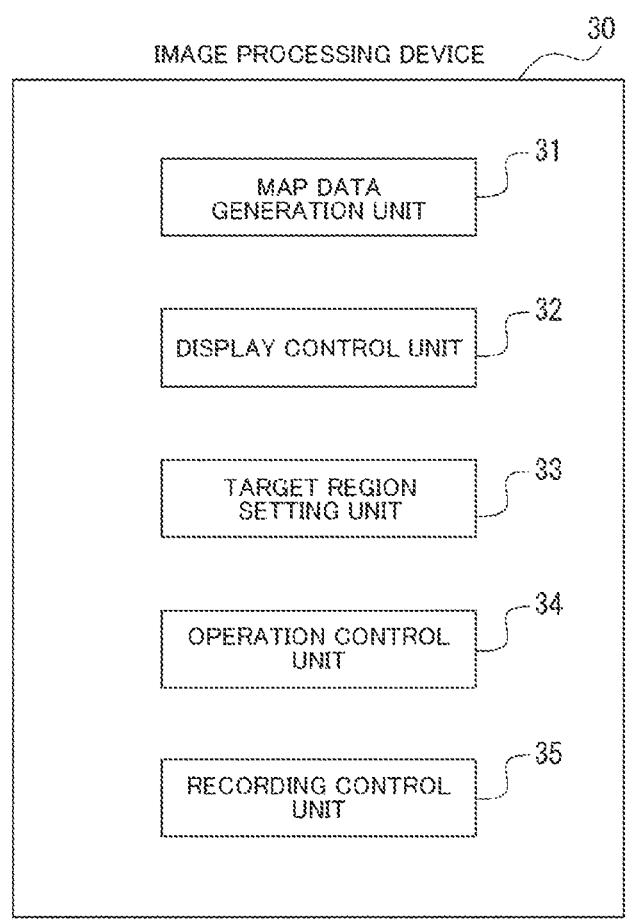
FIG. 6 is an illustrative diagram of a functional configuration of an image processing device of the embodiment.

For example, a functional configuration as illustrated in FIG. 6 is constructed in the image processing device 30 using the following software (application program).

That is, the image processing device 30 has functions as a map data generation unit 31, a display control unit 32, a target region setting unit 33, an operation control unit 34, and a recording control unit 35.

The map data generation unit 31 generates defocus map data indicating defocus amounts at a plurality of positions in a captured image obtained by the imaging element unit 12, calculated from phase difference signals (phase difference information) detected by image surface phase difference pixels in the imaging element unit 12.

For example, when a horizontal direction of the captured image is assumed to be an X axis and a vertical direction thereof is assumed to be a Y axis, the map data generation unit 31 generates values (DF1, DF2, DF3, . . . ) of defocus amounts at positions specified by X-axis coordinates (X1, X2, X3, . . . ) and Y-axis coordinates (Y1, Y2, Y3, . . . ) in the captured image as defocus map data, as illustrated in FIG. 7.

In addition, the map data generation unit 31 can calculate subject distances at the plurality of positions in the captured image obtained by the imaging element unit 12 on the basis of the generated defocus map data and lens information and generate depth map data indicating the calculated subject distances.

For example, the map data generation unit 81 generates values (DP1, DP2, DP3, . . . ) of subject distances at positions specified by X-axis coordinates (X1, X2, X3, . . . ) and Y-axis coordinates (Y1, Y2, Y3, . . . ) in the captured image as depth map data, as illustrated in FIG. 8.

The display control unit 32 generates a defocus map image representing a distribution of the defocus amounts of the captured image using the defocus map data generated by the map data generation unit 31 and perform display control. For example, the display control unit 82 causes the defocus map image to be overlaid on the captured image such that the defocus map image is displayed on the display unit 15 of the imaging device 1.

The display control unit 32 switches whether to perform overlaid display of a defocus map image with respect to a normal captured image at a predetermined timing.

Further, the display control unit 32 may cause the defocus map image to be displayed according to a blending (processing of superimposing a translucent image by multiplying a value α) or cause, the defocus map image to be displayed by outputting the defocus map image alone.

The display control unit 32 generates a depth map image representing a distribution of the subject distances in the captured image using the depth map data generated by the map data generation unit 31 and performs display control. The display control unit 32 switches whether to perform overlaid display of a depth map image with respect to a normal captured image at a predetermined timing.

The display control unit 32 causes display of a map image to start or to end at various timings. For example, the display control unit 32 may cause display of a map image to start or to end in response to a user operation.

In addition, the display control unit 32 can cause a map image to be displayed at various timings, for example, at the time of starting a focus control operation in an autofocus mode, at the time of focusing by a focus control operation in the autofocus mode, at the time of detecting a focus adjustment operation or an aperture adjustment operation by a user in a manual focus mode, at the time of starting recording of a captured image, and the like.

Further, the display control unit 32 ends display control of a map image after the lapse of predetermined time from display of the map image, and the like. The display control unit 32 may also perform display control of switching between a defocus map image and a depth map image.

The target region setting unit 33 sets a target region in a captured image. A target region is a whole or a part of a captured image.

The target region setting unit 33 sets the target region, for example, depending on details of the captured image.

Details of a captured image are, for example, a mode set in the imaging device 1. For example, when the imaging device 1 is set in a face detection mode, the target region setting unit 33 detects a face region through image analysis processing and sets the detected face region as the target region. In addition, when the imaging device 1 is set in a pupil detection mode, the target region setting unit 33 detects a pupil region through image analysis processing and sets the detected pupil region as the target region.

Further, the target region setting unit 33 can set, for example, a region in the captured image designated by a user operation as the target region.

When the target region is set in the captured image by the target region setting unit 33, the map data generation unit 31 can generate defocus map data and depth map data in the target region.

The operation control unit 34 performs, for example, imaging operation control in the target region using the defocus map data generated by the map data generation unit 31. The operation control unit 34 performs, for example, operation control of the focus lens or the aperture mechanism of the lens system 11. The operation control unit 34 performs focus control by controlling operation of the focus lens and performs control of causing change in a depth of field by controlling operation of the aperture mechanism.

Further, the operation control unit 34 may perform imaging operation control on the basis of an acquired phase difference signal without using the defocus map data in imaging operation control.

The recording control unit 35 causes the defocus map data and the depth map data generated by the map data generation unit 31 to be recorded as additional information for frame data of the captured image.

Meanwhile, although an example in which the image processing device 30 is built in the camera signal processing unit 13 of the imaging device 1 has been described in FIG. 3, the image processing device 30 may be built, in the camera control unit 18 or may be built in the CPU 41 of the computer device 40 illustrated in FIG. 5.

In addition, the functions of the image processing device 30 may be realized by a plurality of image processing devices 30. For example, the image processing device 30 built in the camera signal processing unit 13 may have the functions of the map data generation unit 31, the target region setting unit 33, and the recording control unit 35, and the image processing device 30 built in the camera control unit 18 may have the functions of the display control unit 32 and the operation control unit 34.

Processing for realizing the present technology is performed by the imaging device 1 including the image processing device 30 having the above-described functions of FIG. 6.

<3. Map Image Display Mode and Imaging Operation Control>

Figure 9:
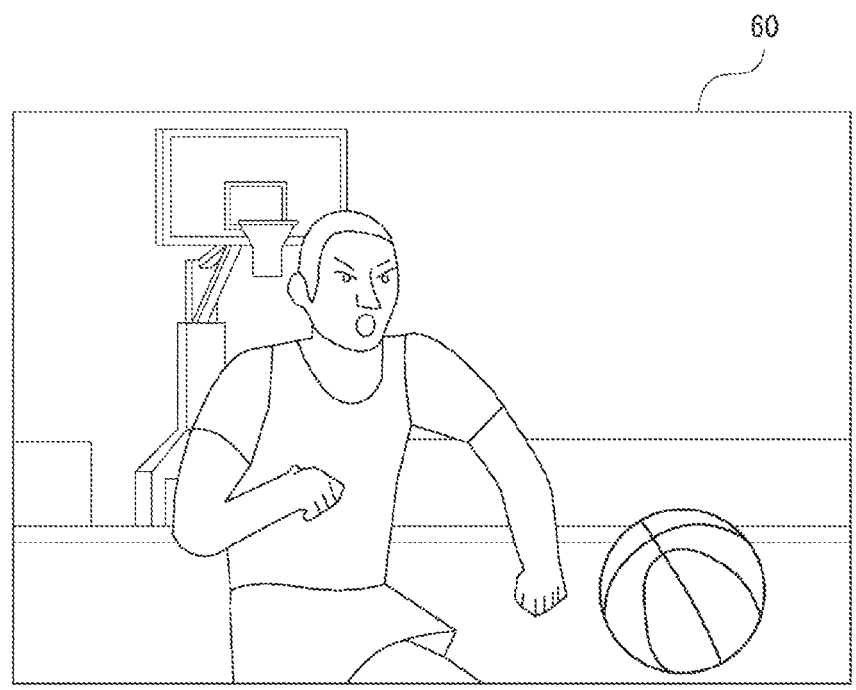
FIG. 9 is an illustrative diagram of a display example of a captured image of the embodiment.
Figure 10:
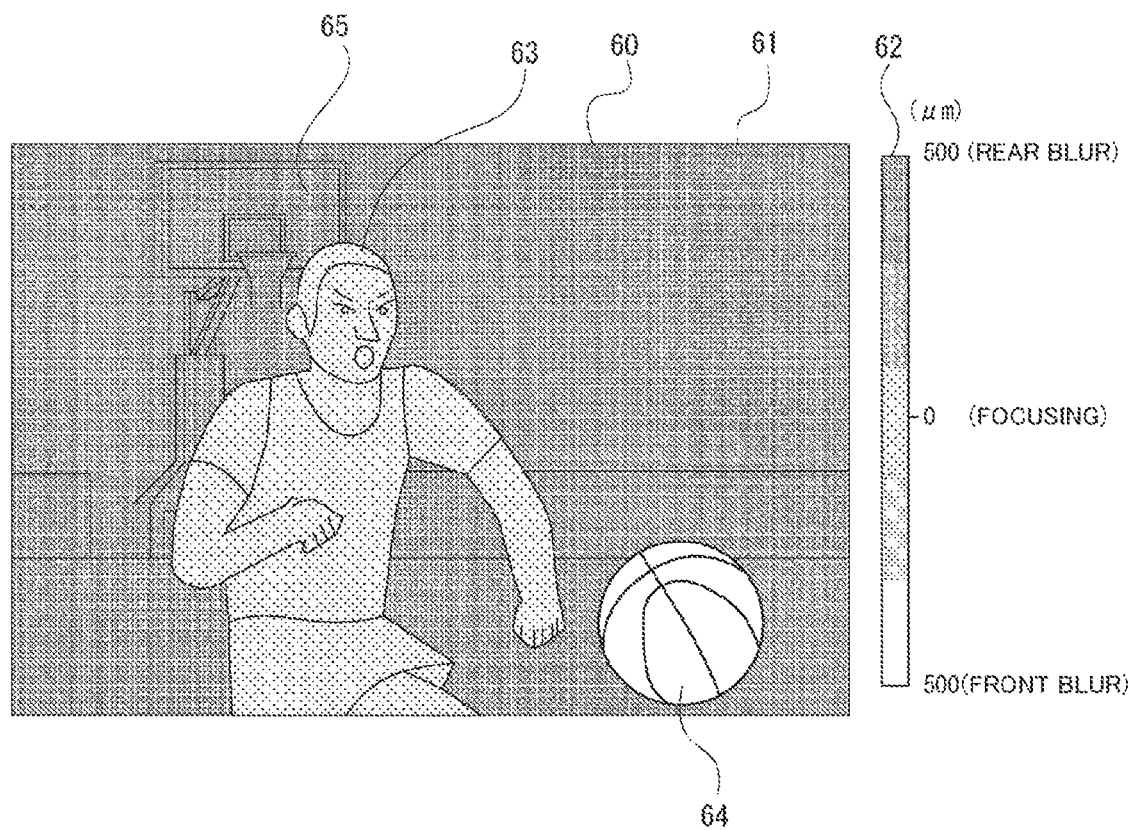
FIG. 10 is an illustrative diagram of a display example of a defocus map image of the embodiment.
Figure 11:
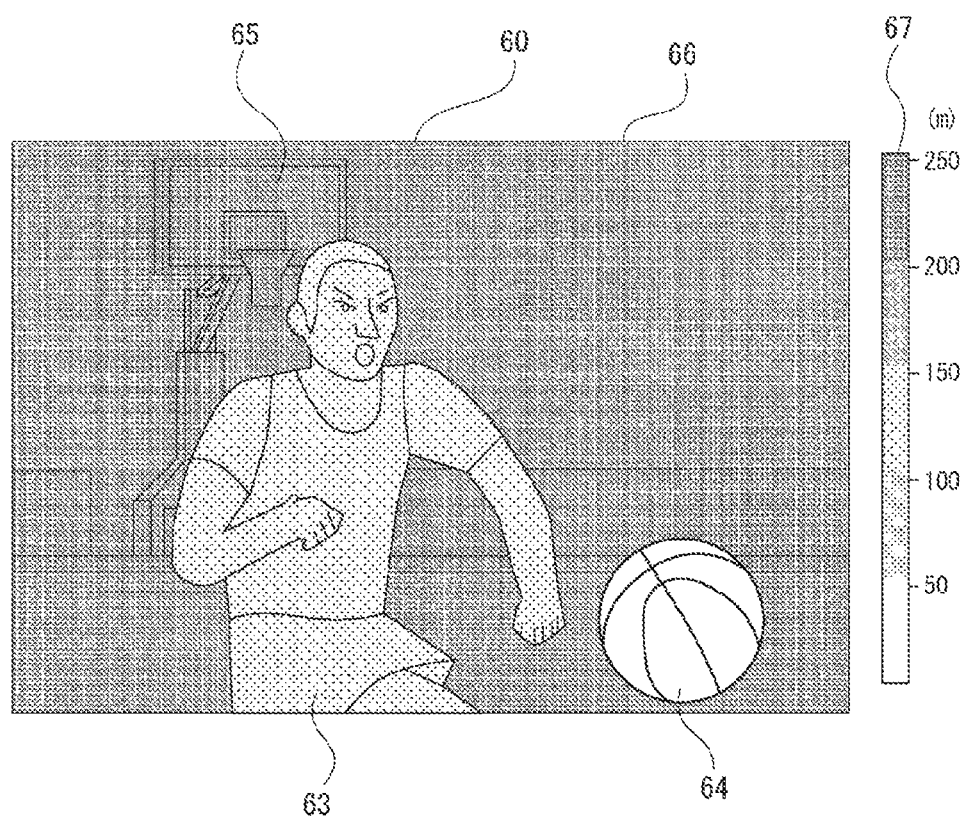
FIG. 11 is an illustrative diagram of a display example of a depth map image of the embodiment.

An example of a map image display mode and imaging operation control in the present technology will be described with reference to FIG. 9 to FIG. 17. FIG. 9 to FIG. 11 are examples of display modes of a map image in which a whole captured image is set as a target region.

FIG. 9 illustrates a display example of a captured image captured in the imaging device 1. In FIG. 9, a map image is not overlaid and displayed on the captured image 60. The captured image 60 is displayed as a live view image on the display unit 15 of the imaging device 1. The display unit 15 may be, for example, a liquid crystal monitor, a viewfinder, or the like.

FIG. 10 illustrates a display example of a defocus map image having defocus amount information added to the captured image. In FIG. 10, a defocus map image 61 and a defocus meter 62 are displayed on the display unit 15 of the imaging device 1.

The defocus map image 61 is overlaid and displayed on the captured image 60 and, for example, color classification is performed depending on a defocus amount of each position of the captured image to cause the defocus map image 61 to be displayed like a bitmap. Accordingly it is possible to visually recognize a defocus amount of each position in the whole captured image. Further, color classification is schematically represented as dotting, and a dotting density difference is illustrated as a color difference in FIG. 10. The defocus map image 61 is generated by the image processing device 30 using defocus map data.

The defocus meter 62 indicates a value of a defocus amount corresponding to a color of the defocus map image 61. Accordingly, it is possible to easily visually recognize a level of a color displayed in the defocus map image 61 as a defocus amount.

By displaying the defocus map image 61 in this manner, a distribution of defocus amounts at respective positions in the captured image 60 can be visually easily recognized according to color variation.

For example, in FIG. 10, it is possible to visually confirm that a subject 63 is in a focused state, a subject 64 positioned in front of the subject 63 is in a front blur state due to decrease in a focusing degree, and a subject 65 positioned behind the subject 63 is in a rear blur state due to decrease in a focusing degree.

Further, in FIG. 10, it is possible to visually recognize a quantitative focusing degree (a degree of blur depending on front and rear blur amounts) in the whole captured image such as the background including the subject 63, the subject 64, and the subject 65 in the captured image 60. Accordingly it is possible to perform focusing in consideration of the focusing degree of the whole captured image, for example, when a user performs a manual focus operation.

FIG. 11 illustrates a display example of a depth map image of the captured image. In FIG. 11, a depth map image 66 and a depth meter 67 are displayed on the display unit 15 of the imaging device 1.

The depth map image 66 is overlaid and displayed on the captured image 60 and color-classified in response to a subject distance at each position in the captured image 60. Further, in FIG. 11, a subject distance difference is schematically represented as dotting, and a dotting density difference is indicated as a subject distance difference. The depth map image 66 is generated by the image processing device 30 using depth map data.

The depth meter 67 indicates a value of a subject distance corresponding to a color of the depth map image 66. Accordingly, it is possible to visually easily recognize a subject distance corresponding to a color displayed in the depth map image 66.

By displaying the defocus map image 61 in this manner, a subject distance at each position in the captured image 60 can be visually easily recognized according to color variation.

For example, in FIG. 11, it is possible to visually recognize that the subject 65 is positioned behind the subject 63 and the subject 64 is positioned in front of the subject 63. Accordingly it is possible to adjust a depth of field in consideration of a subject distance of each subject in the whole captured image.

Further, a region of a part corresponding to a predetermined defocus amount range may also be set to a target region and displayed as a defocus map image. Accordingly it is possible to visually easily confirm a region having a predetermined defocus amount.

In addition, only a region corresponding to a predetermined subject distance range may also be set to a target region and displayed as a depth map image. Accordingly it is possible to visually easily confirm a region having a predetermined subject distance.

The defocus amount range and the subject distance range may be set in advance or appropriately set by a user operation.

FIG. 12 to FIG. 17 are examples of imaging operation control performed on a target region corresponding to a part of a captured image.

Figure 12:
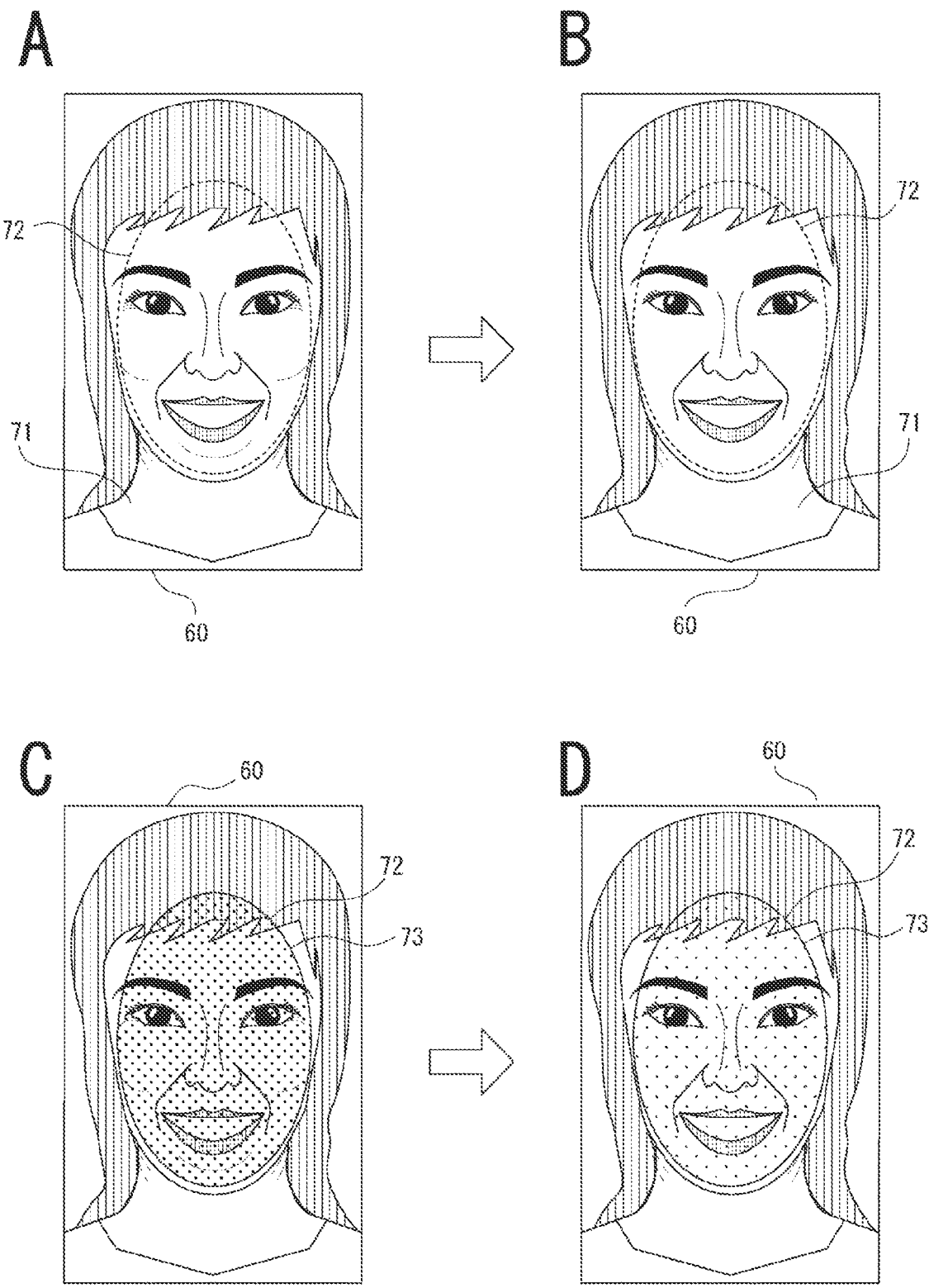
FIG. 12 is an illustrative diagram of an example of imaging operation control in a face region of the embodiment.
Figure 13:
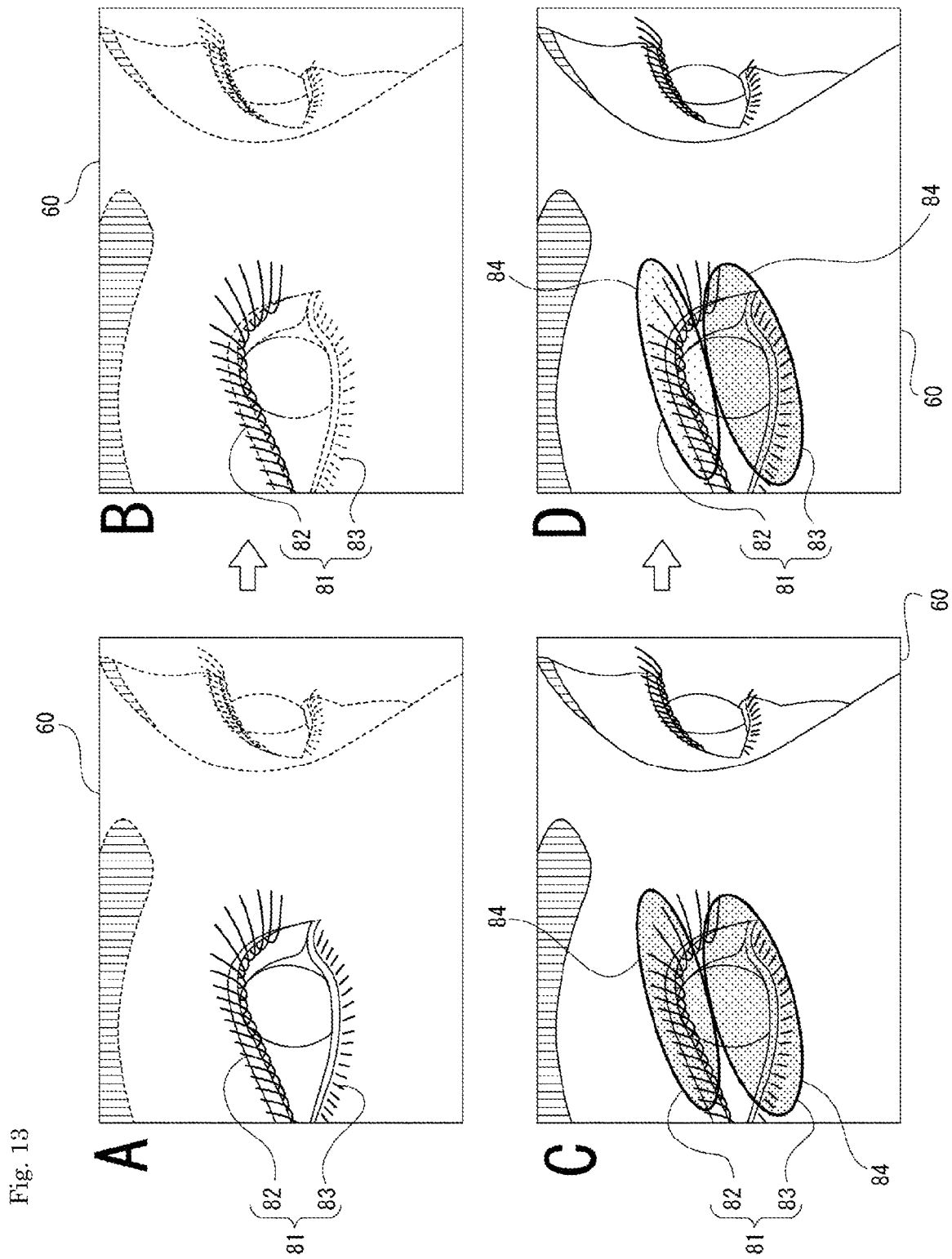
FIG. 13 is an illustrative diagram of an example of imaging operation control in a pupil region of the embodiment.

FIG. 12 and FIG. 13 illustrate examples in which a focusing position is automatically adjusted depending on a target region detected from the captured image.

In FIG. 12, an example of adjusting a focusing position when a face region of a subject is set to a target region is described.

A captured image 60 of FIG. 1.2A represents a state in which a focusing position of a target region (face region) is not adjusted and is an image in which wrinkles at the corners of eyes, cheeks, chin, and the like relatively stand out in a face region 72 of a subject 71. This is caused by the fact that details of a subject can be displayed in more detail according to increase in the number of pixels and high grayscales of the imaging device 1 (image processing device 30).

Next, a result of adjustment of a focusing position of the target region (face region) performed on the captured image 60 of FIG. 12A is illustrated in FIG. 12B. In FIG. 12B, the face region 72 of the subject 71 in the captured image 60 is detected and imaging operation control of finely shifting the detected face region 72 from the focusing position is performed. Accordingly the face region 72 of the subject 71 is slightly blurred, and thus it is possible to cause the wrinkles at the corners of the eyes, cheeks, chin, and the like of the face region 72 not to stand out.

A shift amount from the focusing position can be set depending on attributes of the detected face region 72, that is, the size, number, position, age, gender, and the like of the face region 72. The shift amount from the focusing position may be set in advance or set by a user operation.

The aforementioned imaging operation control is automatically performed upon detection of the face region 72 from the captured image 60.

A subject can be more clearly displayed due to improvement of the imaging performance of the imaging device 1 (image processing device 30) whereas the reality of the subject excessively increases and thus a user viewing a captured image may be given unnatural impression according to a situation in which imaging is performed, but a captured image that does not discomfort the user can be provided according to a subject in the captured image by intentionally finely shifting the subject from a focusing position.

In addition, a defocus map image 73 can be overlaid and displayed on the face region 72, as illustrated in FIG. 12C and FIG. 12D. In an example of the defocus map image 73, a distribution of defocus amounts is displayed in colors depending on the defocus amounts with respect to the face region 72.

FIG. 12C illustrates the defocus map image 73 when the face region 72 is a focusing position and FIG. 12D illustrates the defocus map image 73 after imaging operation control of finely shifting the face region 72 from the focusing position is performed.

Accordingly, it is possible to visually recognize defocus amount change in the face region 72.

In FIG. 13, an example of adjusting a degree of blur in each part of a pupil region when the pupil region of a subject is set to a target region by controlling a depth of field will be described.

FIG. 13A illustrates a state in which both an eyelash region 82 and a region 83 other than the eyelashes in a pupil region 81 of a captured image 60 are not blurred and FIG. 13B illustrates a state in which the eyelash region 82 is not blurred and the region 83 other than the eyelashes is blurred. In FIG. 13A and FIG. 13B, a region that is not blurred is represented by a solid line and a region that is blurred is represented by a broken line.

As a captured image expression technique, for example, there is a technique of sharply displaying the eyelash region 82 without blurring it and slightly burring the region 83 other than the eyelashes in the eyelash region 82 and the region 83 other than the eyelashes in the pupil region 81. Such a high-definition expression technique has become useful because expression of a fine depth of a pupil is reflected on a monitor due to increase in the number of pixels and high grayscales.

For example, it is possible to automatically perform F value control by setting a depth of field in the pupil region 81 in advance and control a degree of blur of the eyelash region 82 and the region 83 other than the eyelashes.

A control amount of the depth of field in the pupil region 81 may be set in advance, for example, depending on information such as the size, position, age, and gender of the detected pupil region or set by a user operation.

According to the aforementioned example, it is possible to automatically control an F value such that blurring of the eyelashes and blurring of the pupil are balanced to obtain an optimal depth of field.

In addition, a defocus map image 84 can be overlaid and displayed on each of the eyelash region 82 and the region 83 other than the eyelashes in the pupil region 81, as illustrated in FIG. 13C and FIG. 13D. In an example of the defocus map image 84, a distribution of defocus amounts of the pupil region. 81 is displayed in colors depending on defocus amounts of each part. Accordingly it is possible to visually recognize a defocus amount at each position in the pupil region 84.

FIG. 13C illustrates a state in which the eyelash region 82 and the region 83 other than the eyelashes in the pupil region 81 have the same defocus amount. When the depth of field is controlled in this state, the defocus amount of the eyelash region 82 changes, for example, as illustrated in FIG. 13D.

Figure 14:
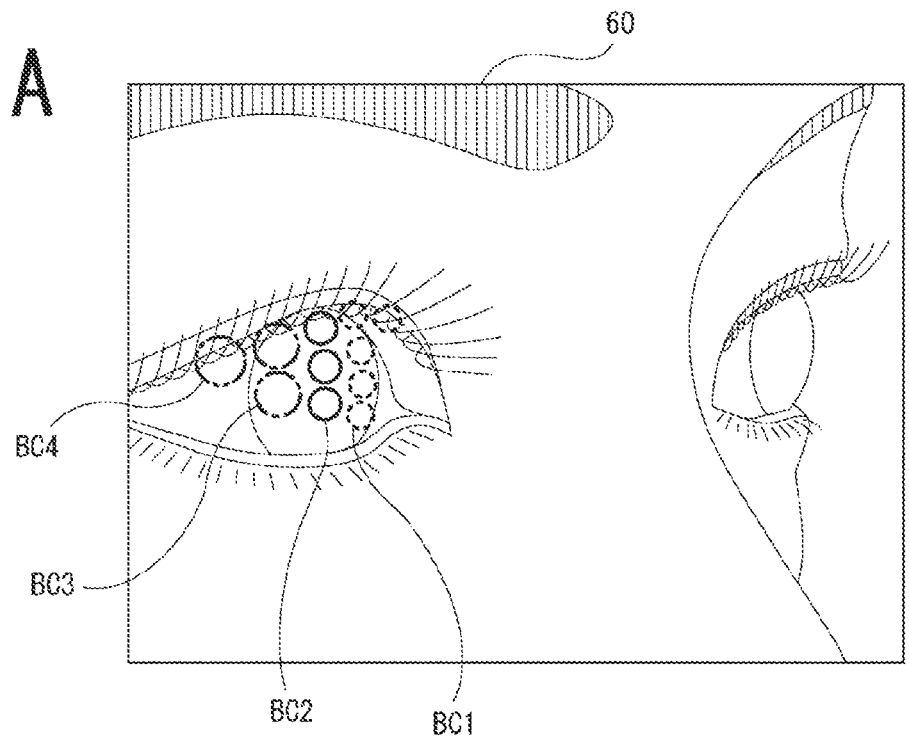
FIG. 14 is an illustrative diagram of a display example of a defocus amount display icon of the embodiment.
Figure 14:
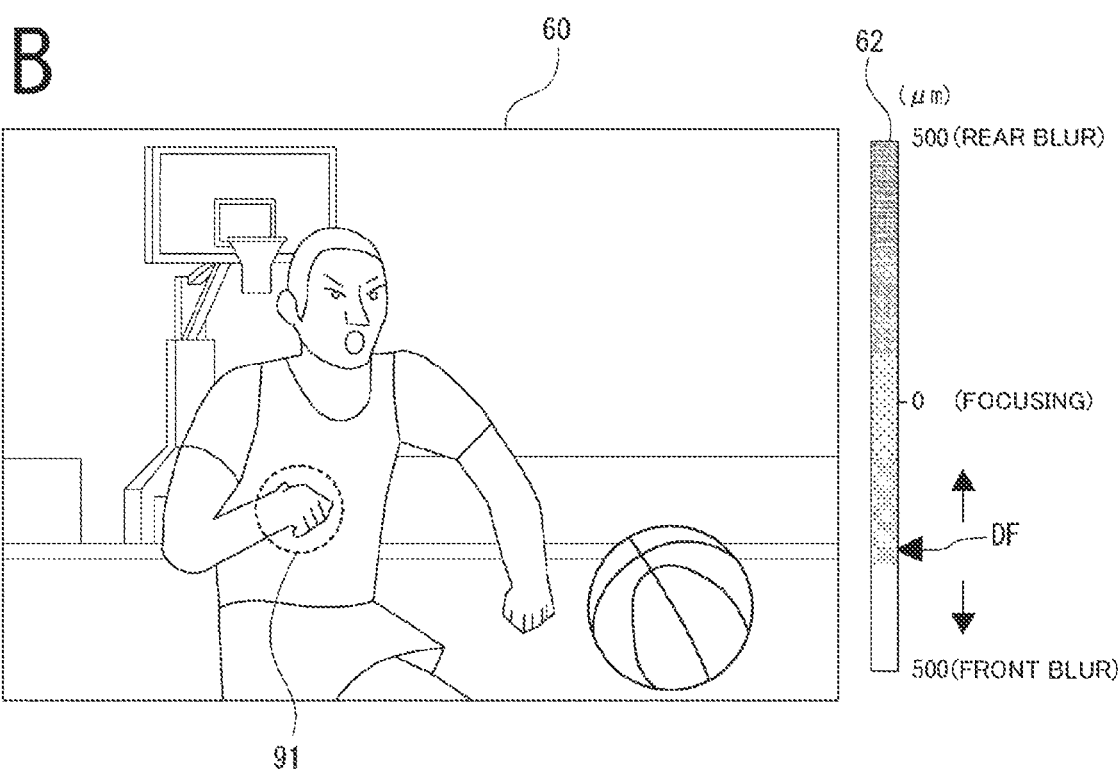

Next, another display mode of a defocus map image, that is, an example of displaying a defocus amount at each position in a captured image using a defocus amount display icon will be described with reference to FIG. 14.

A defocus amount display icon can be displayed as, for example, various symbols such as a ring-shaped or square-shaped frame and a bar indicating the amount of blurring.

In an example illustrated in FIG. 14A, the defocus amount display icon has an annular shape and an annular icon BC having a diameter depending on a defocus amount is displayed in a defocus map image.

Annular icons BC1, BC2, BC3, and BC4 are displayed in different diameters depending on defocus amounts in respective positions in a captured image 60. For example, the diameter of an annular icon BC corresponds to the absolute value of a defocus amount, and the annular icon BC is displayed such that a degree of blur increases as the diameter of the annular icon BC increases.

A user can visually and sensibly recognize a defocus amount at each position in the captured image 60 by visually recognizing the size of the annular icon BC displayed as a defocus map image.

This display mode is useful, for example, at the time of displaying a distribution of defocus amounts at a plurality of positions in a relatively narrow target region such as a pupil region of a subject.

In addition, in the example of FIG. 14A, it is also possible to change the diameter of the annular icon BC by pinching in or pinching out the annular icon BC by a user operation using a touch panel, for example, to adjust a defocus amount at each position corresponding to each annular icon BC.

By increasing the diameter of the annular icon BC by a pinch-out operation, for example, the operation of the focus lens or the aperture mechanism is controlled and a defocus amount at a position corresponding to the annular icon BC increases. In addition, by decreasing the diameter of the annular icon BC by a pinch-in operation, the operation of the focus lens or the aperture mechanism is controlled and the defocus amount at the position corresponding to the annular icon BC decreases.

FIG. 14B is an example of displaying a defocus amount with respect to a region in a captured image selected by operation of a user using a defocus amount display icon (arrow DF).

For example, when the user selects a region 91 in the captured image 60 by touching the touch panel, a defocus amount of the region 91 is indicated by an arrow DF in the defocus meter 62.

In addition, in the example illustrated in FIG. 14B, operation control of the focus lens or the aperture mechanism is performed such that the region 91 has a defocus amount indicated by the arrow DF by sliding the arrow DF provided in the defocus meter 62 up and down by a user operation to move the arrow DF to a position of a desired defocus amount.

Accordingly the user can check a defocus amount at a certain position in the captured image and then intuitively adjust the defocus amount to a desired defocus amount (degree of blur).

Further, a defocus map screen color-classified depending on defocus amounts, as illustrated in FIG. 12C and the like, may be displayed with respect to the region 91 selected by the user. Accordingly it is possible to intuitively recognize change in defocus amounts (change in a degree of blur) by operation.

Furthermore, a distribution of defocus amounts of the whole captured image 60 of FIG. 14B may be color-classified and displayed as illustrated in FIG. 10.

Accordingly, the user can consider defocus amounts of other regions at the time of operating the arrow DF.

Next, a display mode of the defocus amount display icon in a plurality of subjects in a captured image and control thereof will be described with reference to FIG. 15 to FIG. 17.

Figure 15:
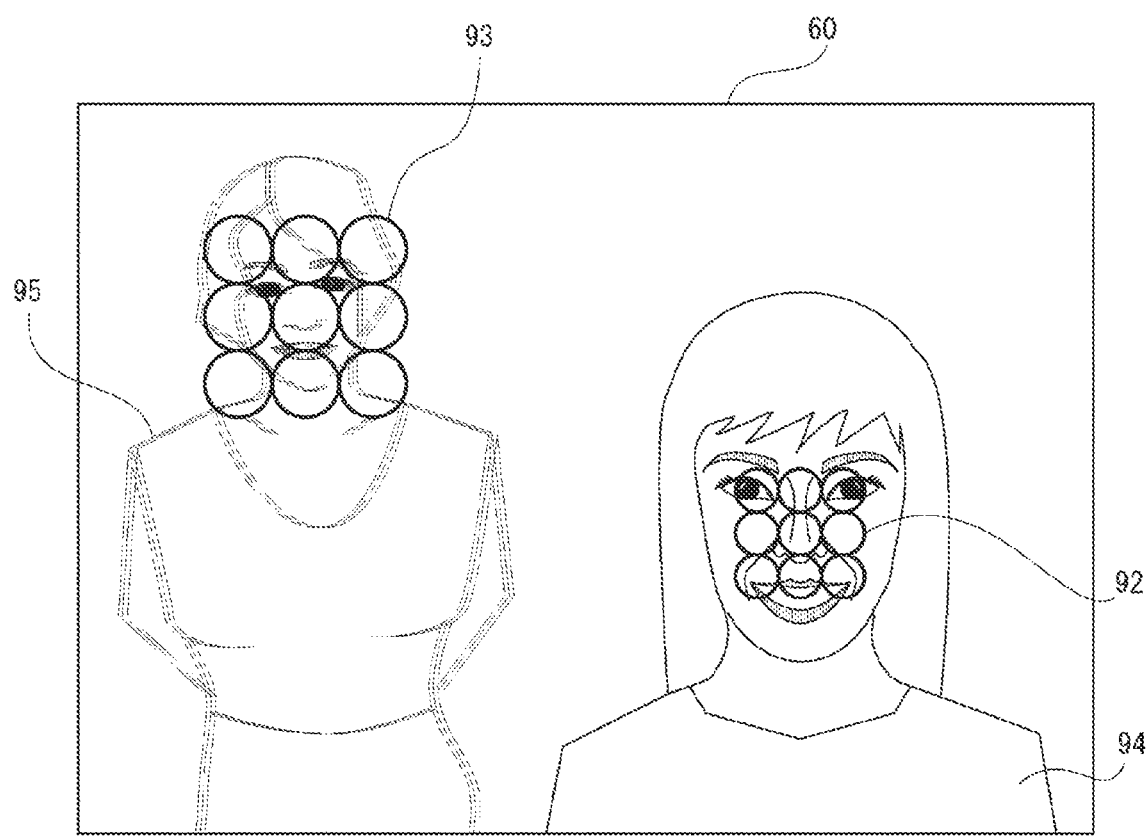
FIG. 15 is an illustrative diagram of an example of defocus amount display icon imaging operation control of the embodiment.

In an example of FIG. 15, icon groups 92 and 93 formed by integrating a plurality of annular icons (configured in 3 columns×3 rows, for example) are displayed as defocus amount display icons in a captured image 60. The diameters of the annular icons constituting the icon groups 92 and 93 indicate, for example, the absolute values of defocus amounts.

The icon groups 92 and 93 are respectively displayed on, for example, two regions selected by a touch operation of a user using the touch panel. In FIG. 15, face regions of a subject 94 and a subject 95 in the captured image 60 are selected and the icon groups 92 and 93 are respectively displayed thereon.

The annular icon groups 92 and 93 are displayed in different sizes depending on defocus amounts at respective positions. FIG. 1.5 illustrates a state in which the face region of the subject 94 is not blurred (is a focusing position) and the face region of the subject 95 is blurred.

At this time, the user can control deviations from respective focusing positions with respect to the positions corresponding to the icon groups 92 and 93 by changing the size of any of the icon groups 92 and 93 by operation. At this time, movement of the focus lens is controlled in response to change in the diameter of the annular icons of the icon group 92, and thus a deviation from the focusing position is controlled.

For example, the user can increase the defocus amount of the face region of the subject 94 by performing a pinch-out operation of the icon group 92 using the touch panel to increase the diameter of the annular icons of the icon group 92 such that, the face region deviates from the focusing position (a degree of blur increases). At this time, when the icon group 92 becomes large, the icon group 93 becomes relatively small and the region corresponding to the icon group 93 is almost focused, and thus the defocus amount of the face region of the subject 95 decreases (a degree of blur decreases).

Figure 16:
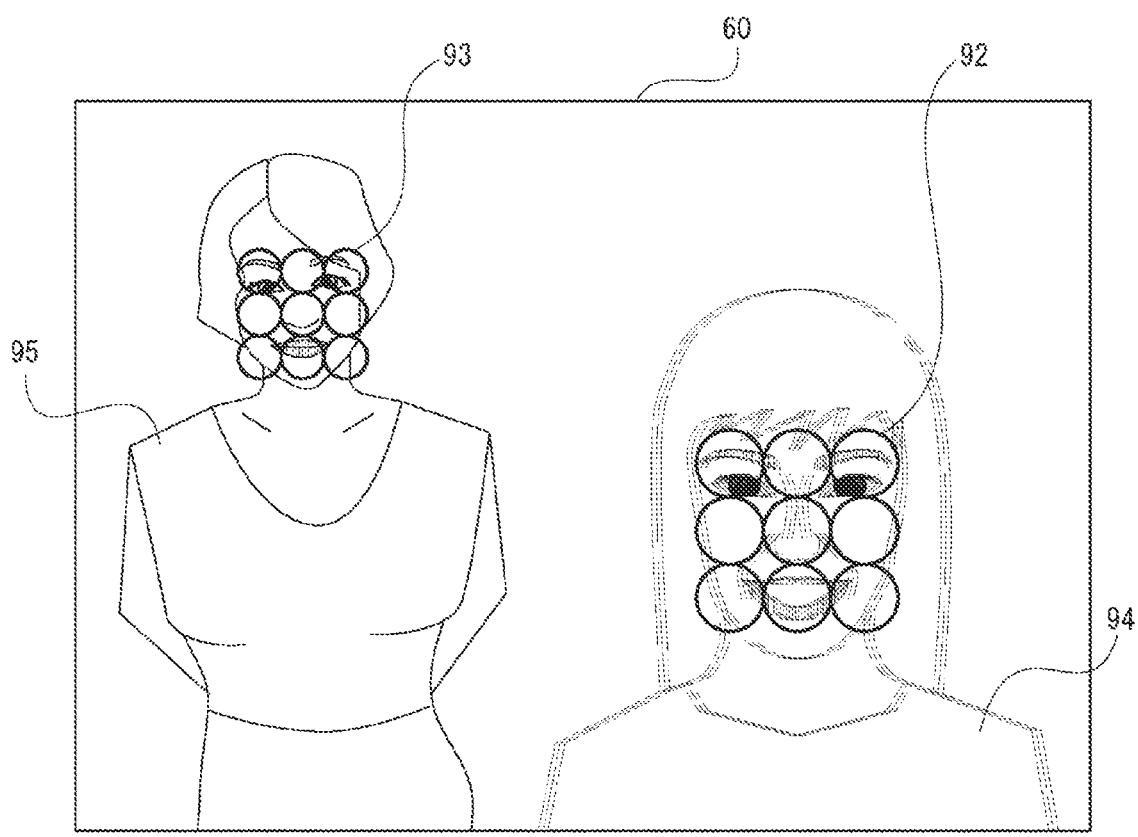
FIG. 16 is an illustrative diagram of an example of defocus amount display icon imaging operation control of the embodiment.

On the other hand, the user can also decrease the diameter of the annular icons of the icon group 93, as illustrated in FIG. 16, by performing a pinch-in operation with respect to the icon group 93. Accordingly, the face region of the subject 95 corresponding to the icon group 93 deviated from the focusing position in FIG. 15 becomes close to the focusing position, and thus defocus of the corresponding region decreases (a degree of blur decreases).

When the diameter of the annular icons of the icon group 93 decreases, the diameter of the annular icons of the icon group 92 relatively increases, and the defocus amount of the face region of the subject 94 corresponding to the icon group 92 increases (a degree of blur increases) because the corresponding region deviates from the focusing position.

By displaying the defocus amount display icons indicating defocus amounts on two selected subjects in this manner, it is possible to visually check a degree of blur of each subject and to control the degree of blur based thereon.

Figure 17:
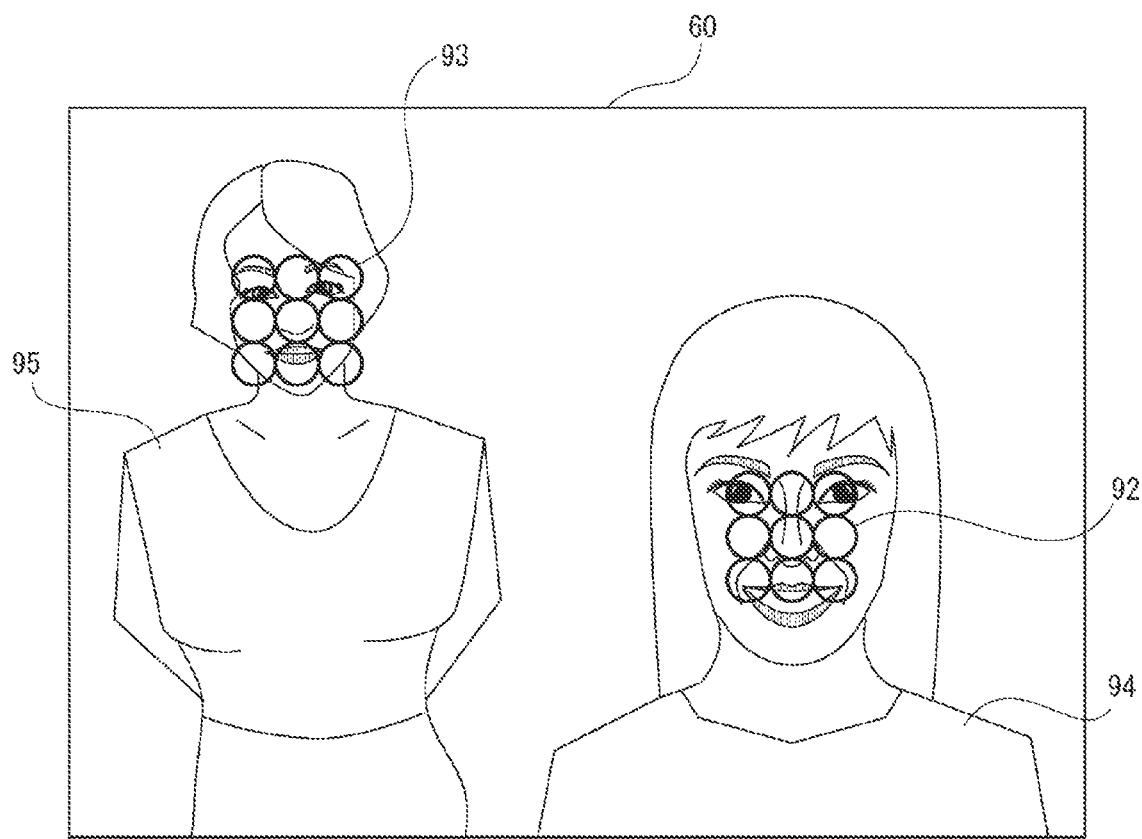
FIG. 17 is an illustrative diagram of an example of defocus amount display icon imaging operation control of the embodiment.

Further, although an example of controlling degrees of blur of the subjects 94 and 95 according to movement control of the focus lens has been described in FIG. 15 and FIG. 16, the degrees of blur of the subjects 94 and 95 can also be controlled according to operation control (F value control) of the aperture mechanism, as illustrated in an example of FIG. 17.

It is possible to cause both the subjects 94 and 95 to be a focused state by controlling the F value and increasing the depth of field according to operation of the aperture mechanism. In this case, the diameters of the annular icons of the annular icon groups 92 and 93 are displayed as the same size, as illustrated in FIG. 17.

As described above, various modes are conceivable with respect to map image display control and imaging operation control in the present technology.

<4. Execution Processing of Image Processing Device>

Processing of the image processing device performed to realize map image display control and imaging operation control in the present technology will be described with reference to FIG. 18 to FIG. 26.

Hereinafter, the first embodiment of the present technology will be described with reference to FIG. 18 and FIG. 19.

The first embodiment is processing for realizing display control of a map image by the image processing device 30 and is an example in which the map image is displayed in the manual focus mode.

Figure 18:
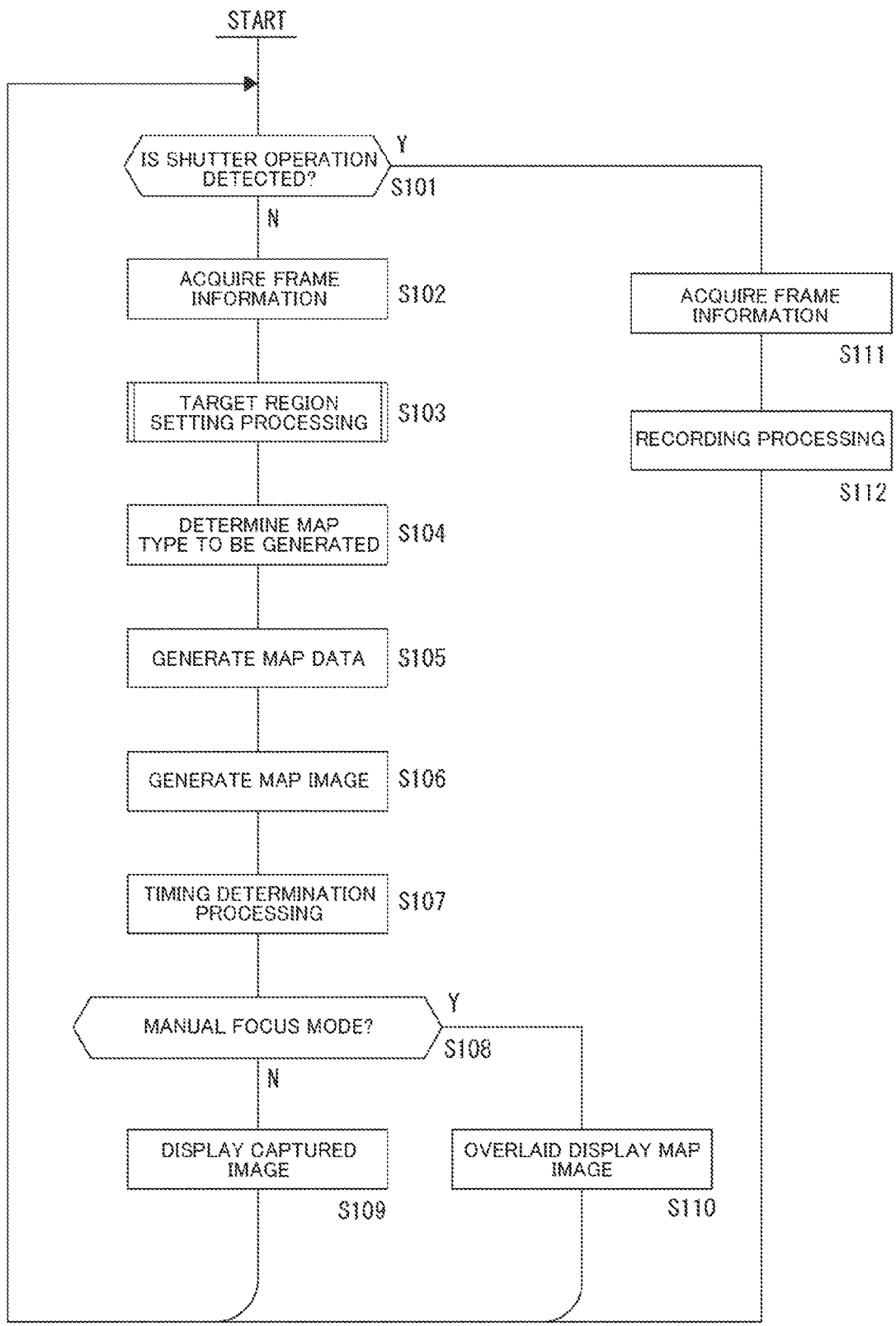
FIG. 18 is a flowchart of a processing example of a first embodiment.

In FIG. 18, the image processing device 30 proceeds with processing to step S102 to acquire frame information from the imaging element unit 12 when a shutter operation by a user is not detected in step S101.

The frame information is, for example, image data of one current frame and various types of map data generated on the basis of a phase difference signal. The image data of one frame mentioned here is image data processed in the camera signal processing unit 13 for display.

The image processing device 30 performs target region setting processing in step S103. Accordingly the image processing device 30 sets a region in which map data such as defocus map data and depth map data is generated in a captured image, that is, a target region.

The details of the target region setting processing will be described with reference to FIG. 19.

The image processing device 30 checks whether the user performs a target region selection operation in step S201, whether the imaging device 1 is set in a face recognition mode in step S202, and whether the imaging device 1 is also set in a pupil recognition mode in step S203. The image processing device 30 proceeds with processing in the order of steps S201, S202, S203, and S204 if not in any of the aforementioned steps.

Figure 19:
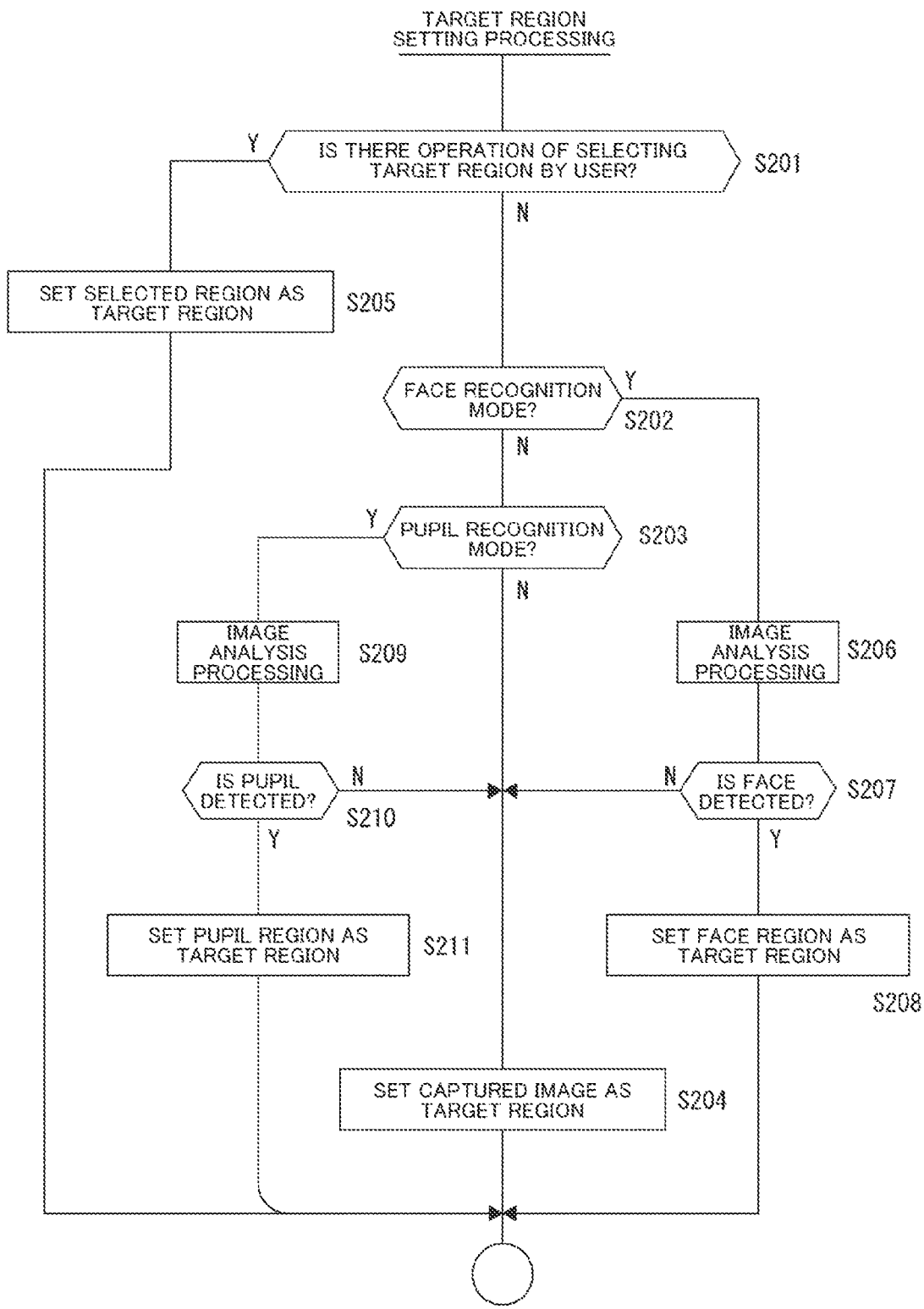
FIG. 19 is a flowchart of a processing example of the first embodiment.

Then, the image processing device 30 sets the captured image as a target region in step S204 and ends processing of FIG. 19. Accordingly, the whole captured image is set as the target region.

When the user has performed the target region selection operation in step S201, the image processing device 30 proceeds with processing to step S205 to set a selected region selected by user operation as a target region and ends processing of FIG. 19. As illustrated in FIG. 14B, for example, the region 91 selected by the user through the touch panel is set as a target region.

Meanwhile, the selected region selected by user operation may be a selected region selected by the user in advance. For example, a predetermined defocus amount or subject distance is set, and the image processing device 30 can also set a region corresponding to the predetermined defocus amount or subject distance as a target region in step S205. In this case, inforination generated in previous frames may be used for defocus amounts or subject distances in the captured image.

When the imaging device 1 is set in the face recognition mode in step S202, the image processing device 30 detects a face region by performing image analysis processing on the captured image in step S206.

The image processing device 30 proceeds with processing in the order of steps S207 and S208 to set the face region as a target region and end processing of FIG. 19 when the face region is detected in step S206.

In addition, the image processing device 30 proceeds with processing in the order of steps S207 and S204 to set the whole captured region as a target region and end processing of FIG. 19 when the face region is not detected in step S206.

When the imaging device 1 is set in the pupil recognition mode in step S203, the image processing device 30 detects a pupil region by performing image analysis processing on the captured image in step S209.

The image processing device 30 proceeds with processing in the order of steps S210 and S211 to set the pupil region as a target region and end processing of FIG. 19 when the pupil region is detected in step S209.

In addition, the image processing device 30 proceeds with processing in the order of steps S210 and S204 to sets the whole captured image as a target region and end processing of FIG. 19 when the face region is not detected in step S210. The target region in which map data is generated is set through the above-described processing.

Referring back to FIG. 18, the image processing device 30 proceeds with processing to step S104 from step S103 to execute determination of a map type to be generated. That, is, the image processing device 30 determines which of defocus map data and depth map data will be generated in generation of map data.

For example, the image processing device 30 determines a mode in which any of a defocus map data image and a depth map image is displayed and determines which map data will be generated depending on the mode.

In addition, the image processing device 30 can also determine which map data will be generated in response to a user operation state, such as setting generation of depth map data when a user operation for controlling operation of the aperture mechanism is detected, for example.

In step S105, the image processing device 30 executes generation of map data that is defocus map data or depth map data determined in step S104.

The image processing device 30 generates defocus map data representing a defocus amount at each position in the target region, as illustrated in FIG. 7, by performing a correlation operation with respect to defocus using a phase difference signal acquired in step S102 with respect to the target region. In addition, the image processing device 30 generates depth map data representing a subject distance at each position in the target region, as illustrated in FIG. 8, by calculating subject distances on the basis of defocus information in the generated defocus map data and lens information. Further, the image processing device 30 may generate not only any of the pieces of map data to be displayed but also both the pieces of map data in step S104. Accordingly; it is possible to record both the defocus map data and the depth map data in step S112 which will be described later.

In step S106, the image processing device 30 generates a map image with respect to the map data generated in step S105 and determined to be displayed in step S104.

For example, a map image classified by colors depending on a distribution of defocus amounts or subject distances is generated, as illustrated in FIG. 10 and FIG. 11. In addition, if the map image is a defocus map image, a defocus map image in which a defocus amount at each position is displayed using a defocus amount display icon may be generated, as illustrated in FIG. 14.

The image processing device 30 executes timing determination processing for determining a display timing of the map image in step S107. Here, the image processing device 30 determines whether the imaging device 1 is set in the manual focus mode.

When the imaging device 1 is not set in the manual focus mode, the image processing device 30 determines that it is not the display timing of the map image in step S108, proceeds with processing to step S109 to display only the captured image without causing the map image to be overlaid and displayed on the captured image.

In addition, when the imaging device 1 is set in the manual focus mode, the image processing device 30 determines that it is the display timing of the map image in step S108, proceeds with processing to step S110 to cause the map image to be overlaid and displayed on the captured image.

Meanwhile, in timing determination processing in step S107, an example in which the image processing device 30 determines a display timing of the map image in response to detection of a user operation may also be conceived.

Here, the user operation is an operation for switching between on/off of display of the map image and, for example, it is conceivable that a button for switching display of the map image is provided and an on/off operation of the button is assumed to be a user operation.

Further, as a user operation, various operations such as half push/full push operations of a shutter button of the imaging device and captured image recording starting/ending operations may be conceived. For example, in the case of the half push/full push operations of the shutter button of the imaging device, the half push operation can be assumed to be a map image display on operation and the full push operation can be assumed to be a map image display off operation. In addition, in the case of the captured image recording starting/ending operations, the recording starting operation can be assumed to be a map image display on operation and the recording ending operation can be assumed to be a map image display off operation. In this manner, an operation of switching between on/off of map image display can be allocated to various operations.

In this case, when a user operation of turning on display of the map image is detected in step S107, the image processing device 30 determines that it is the display timing of the map image in step S108 and proceeds with processing to step S110 to cause the map image to be overlaid and displayed on the captured image.

In addition, when a user operation of turning off display of the map image is detected in step S107, the image processing device 30 determines that it is not the display timing of the map image in step S108 and proceeds with processing to step S109 to display only the captured image without causing the map image to be overlaid and displayed on the captured image.

The image processing device 30 returns to step S101 and checks detection of a shutter operation when processing of step S109 or step S110 ends.

When the shutter operation is detected in step S101, the image processing device 30 proceeds with processing to step S111 to acquire frame information of an imaging signal, a phase difference signal, or the like. At this time, when generated map data exists, the image processing device 30 also acquires the map data.

The image processing device 30 performs processing of recording the acquired frame information and the map data in step S112. The image processing device 30 records the map data as additional information of the frame information. Accordingly, defocus amount information at each position in the captured image is recorded as metadata of the captured image.

The image processing device 30 returns to step S101 and performs the same processing as the above-described processing after processing of step S112.

Meanwhile, although the image processing device 30 can record map data at any time in step S112 when the shutter operation is detected in step S101 by executing processing of steps S103 to S106 far each frame in the above description, the map data may not necessarily be recorded in step S112.

In such a case, the image processing device 30 may perform processing in the order of steps S107 and S108 after step S102, and when a determination flag is OFF in step S103, may proceed to processing of step S109.

Accordingly when the map image need not be displayed, the image processing device 30 can display the captured image in step S109 without performing processing of steps S103 to S106, that is, generation of the map data. In this case, in step S108, the image processing device 30 generates the map image through steps S103 to S306 and then causes the map image to be overlaid and displayed on the captured image in step S110.

Through the above-described processing, map image display control by the image processing device 30 in the first embodiment is realized. Accordingly, when the imaging device 1 switches to the manual focus mode, for example, the defocus map image 61 as illustrated in FIG. 10 or the depth map image 66 as illustrated in FIG. 11 is displayed.

In addition, when the imaging device 1 is in the face authentication mode, the map image is displayed on the detected face region (target region), as illustrated in FIG. 12C and FIG. 12D, at a map image display timing. Likewise, when the imaging device 1 is in the pupil authentication mode, the map image in each part of the detected pupil region (target region) is displayed, as illustrated in FIG. 13C and FIG. 13D.

Accordingly the user can visually and intuitively recognize a defocus amount or a subject distance at each position in a target region of the captured image 60. In addition, the user can perform focus control or F value control through a manual operation while considering the defocus amount or the subject distance at each position.

A second embodiment of the present technology will be described with reference to FIG. 20 and FIG. 21.

The second embodiment is processing for realizing map image display control by the image processing device 30 and is an example in which in which a map image is displayed at a predetermined timing in the autofocus mode or the manual focus mode. Further, in the second embodiment, the image processing device 30 ends display of a map image after the elapse of a predetermined time from display of the map image.

Figure 20:
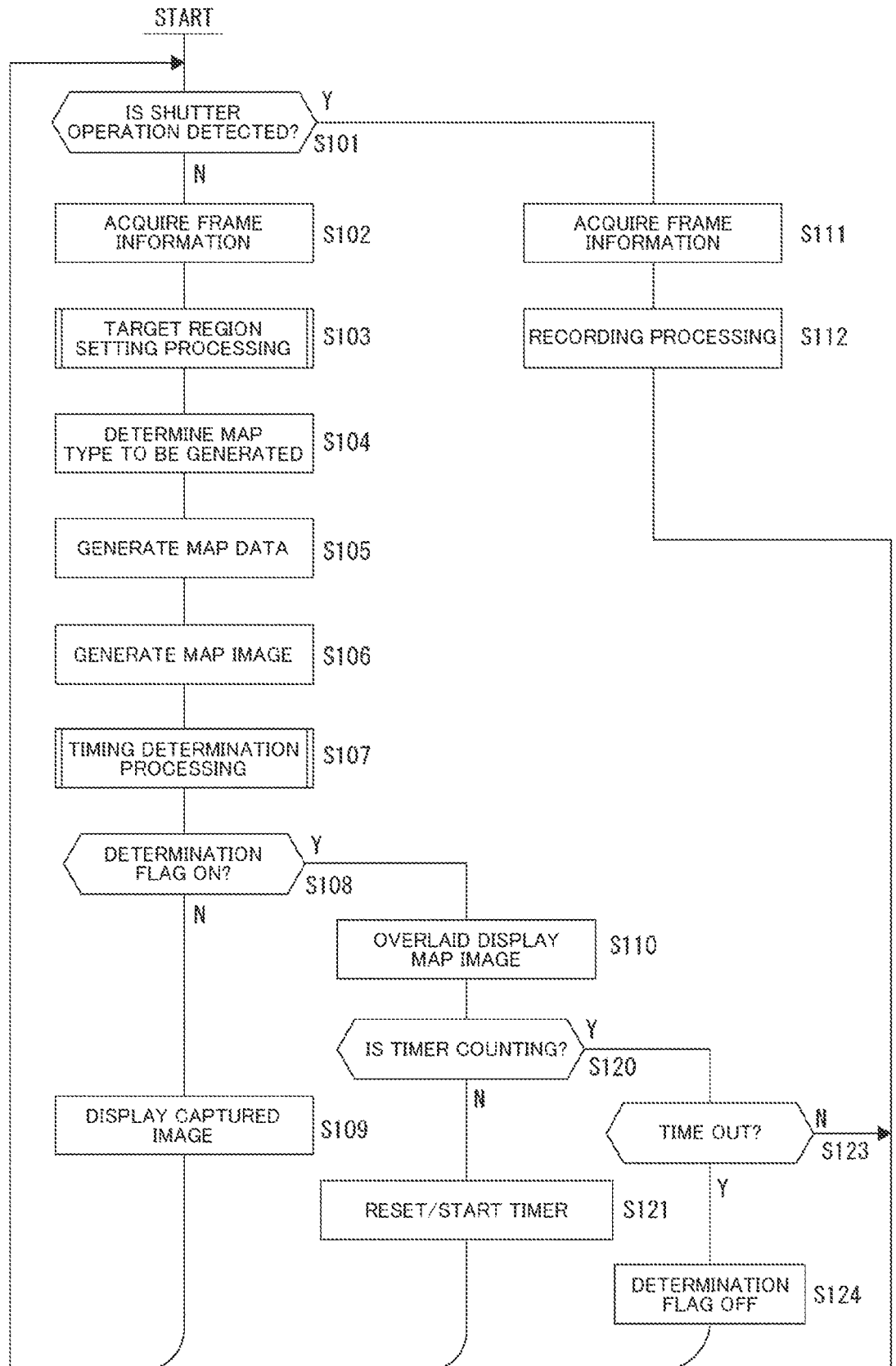
FIG. 20 is a flowchart of a processing example of a second embodiment.

In FIG. 20, the image processing device 30 proceeds with processing to step S102 to acquire frame information from the imaging element unit 12 when a shutter operation is not detected in step S101. Then, the image processing device 30 performs target region setting processing of FIG. 19 to set a target region in a captured image in step S103.

The image processing device 30 performs determination of a map type to be generated in step S104 and generates map data corresponding to the determined map type in step S105. Then, the image processing device 30 generates a map image using the map data generated in step S106.

The image processing device 30 executes timing determination processing for determining a display timing of the map image in step S107.

Details of timing determination processing in the second embodiment will be described with reference to FIG. 21.

The image processing device 30 determines whether a mode switching operation is detected in step S310. Mode switching mentioned here is switching from the manual focus mode to the autofocus mode or reverse switching.

The image processing device 30 proceeds with processing to step S313 to determine whether the imaging device 1 is set in the manual focus mode when the mode switching operation is not detected in step S310.

When the imaging device 1 is set in the manual focus mode, the image processing device 30 determines whether a focus adjustment operation is detected in step S314 and determines whether an aperture adjustment operation is detected in step S315.

When any of the focus adjustment operation and the aperture adjustment operation is not detected, the image processing device 30 proceeds with processing to step S316.

The image processing device 30 determines whether the imaging device 1 is set in the autofocus mode in step S316.

When the imaging device 1 is set in the autofocus mode, the image processing device 30 determines whether a focus control operation starts in step S320 and determines whether focusing by the focus control operation is completed in step S321.

Figure 21:
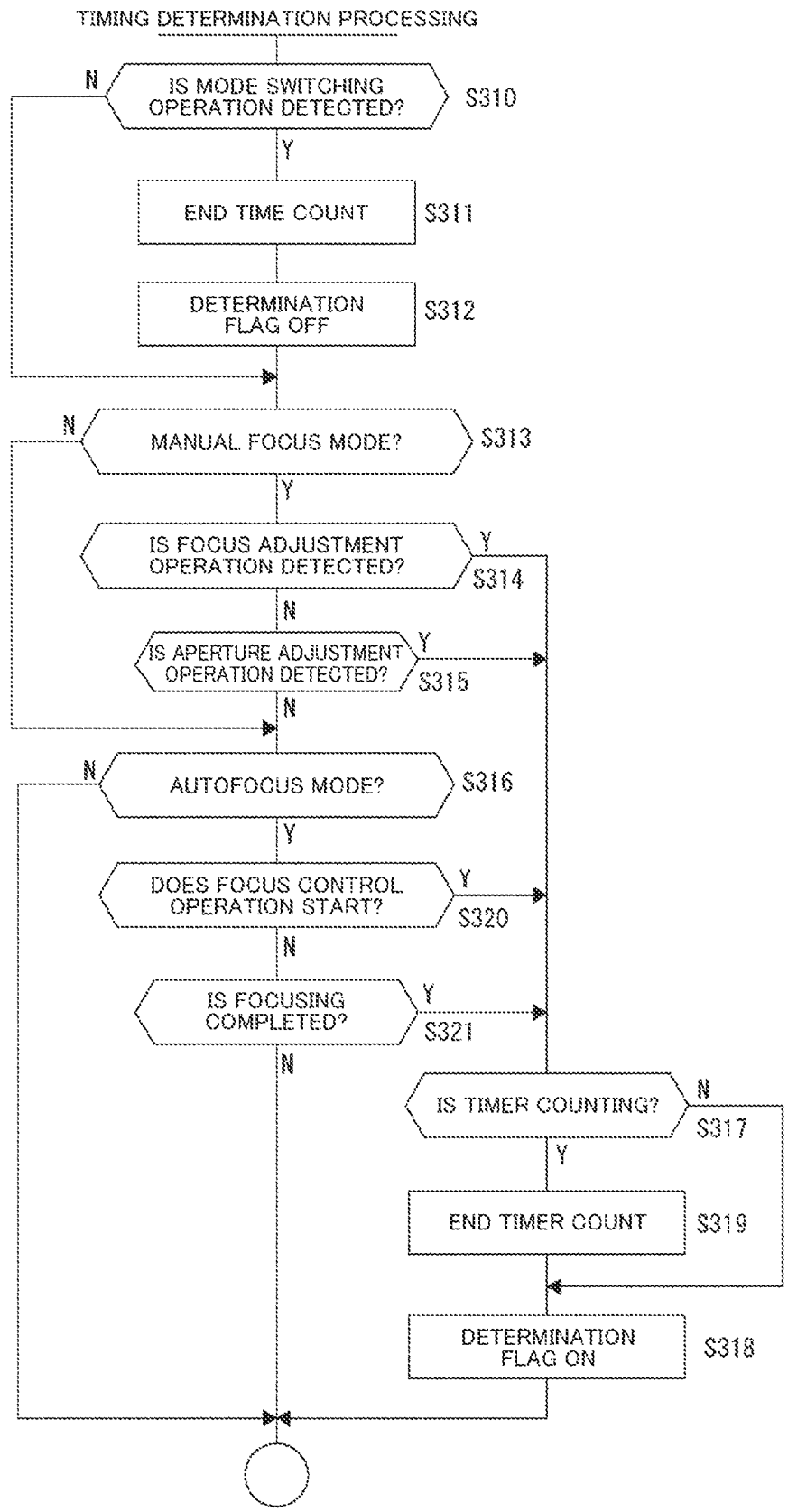
FIG. 21 is a flowchart of a processing example of a second embodiment.

When the focus control operation does not start and focusing by the focus control operation is not completed, the image processing device 30 ends processing of FIG. 21.

On the other hand, when any of the focus adjustment operation or the aperture adjustment operation in the manual focus mode is detected in step S314 or S315, or when the focus control operation starts or focusing by the focus control operation is completed in the autofocus mode in step S320 or S321, processing proceeds to step S317.

The image processing device 30 determines whether a timer is counting in step S317. Timer counting refers to a state in which timer starts counting and does not count time. Timer counting in the second embodiment is a state in which counting starts upon display of a map image and the map image is overlaid and displayed on a captured image during timer counting.

Since timer counting does not start yet here, the image processing device 30 proceeds with processing to step S318 from step S317 to set a determination flag to ON and end processing of FIG. 21.

The determination flag is a flag indicating whether it is a timing at which a map image is displayed and indicates the timing at which the map image is overlaid and displayed on the captured image when set to ON.

According to the aforementioned timing determination processing, the time at which any of the focus adjustment operation and the aperture adjustment operation is detected becomes the map image display timing when the imaging device 1 is set in the manual focus mode, and start of the focus control operation or completion of focusing by the focus control operation becomes the map image display timing when the imaging device 1 is set in the autofocus mode.

Referring back to FIG. 21, the image processing device 30 determines whether the determination flag is ON in step S108. When the determination flag is OFF, the image processing device 30 displays only the captured image in step S109.

When the determination flag is ON, the image processing device 30 proceeds with processing to step S110 to cause the map image to be overlaid and displayed on the captured image.

Then, the image processing device 30 determines whether the timer is counting in step S120.

When the timer is not counting, this means that overlaid display of the map image starts anew, and thus the image processing device 30 resets the timer and causes timer counting to start anew in step S121.

Here, it is conceivable that the timer is set to various time periods such as 5 seconds, 30 seconds, and 1 minute. In addition, different timers may be set depending on detected trigger to start timer counting. For example, the timer may be set to 3 seconds when any of the focus adjustment operation and the aperture adjustment operation is detected in the manual focus mode and the timer may be set to 1 minute from completion of focusing by the focus control operation in the autofocus mode.

Thereafter, the image processing device 30 proceeds with processing in the order of S108, S110, and S120 from step S101 and proceeds with processing to step S123 and S101 when the timer is counting. Accordingly the state in which timer is counting is a state in which the map image is overlaid and displayed on the captured image.

In addition, when timer counting is time out in step S123, the image processing device 30 sets the determination flag to OFF in step S124. Thereafter, the image processing device 30 proceeds with processing after step S101 and proceeds with processing to step S109 in step S108 to cause only the captured image to be displayed. That is, overlaid display of the map image on the captured image ends.

Overlaid display of the map image also ends at the time of switching between the manual focus mode and the autofocus mode.

When the determination flag is ON and the timer is counting, that is, when switching between the manual focus mode and the autofocus mode is performed in overlaid display of the map image, the image processing device 30 proceeds with processing to step S311 from step S310 in timing determination processing of FIG. 21 to end timer counting and set the determination flag to OFF in step S312, and proceeds with processing to step S313.

Accordingly when any of the triggers of steps S314, S315, S320, and S321 is not detected, the image processing device 30 proceeds with processing to step S109 in step S108 of FIG. 20 to ends overlaid display of the map image in the captured image and cause only the captured image to be displayed.

In addition, if any of the triggers of steps S314, S315, S320, and S321 of FIG. 21 is detected anew when the determination flag is ON and the timer is counting, timer counting is reset and processing of re-starting timer counting is performed. By resetting timer counting, a display period of the map image set in response to detection in each of steps S314, S315, S320, and S321 can be secured.

Specifically, the image processing device 30 proceeds with processing in the order of steps S317 and S319 to end timer counting when any of the triggers of steps S314, S315, S320, and S321 is detected. Then, the image processing device 30 proceeds with processing in the order of S318, and S108, S110, S120, and S121 of FIG. 20 to reset/start timer counting.

When the shutter operation is detected in step S101, the image processing device 30 proceeds with processing to step S111 to acquire frame information of an imaging signal, a phase difference signal, or the like. At this time, when generated map data exists, the image processing device 30 also acquires the map data.

The image processing device 30 performs processing of recording the acquired frame information and the map data in step S112. The image processing device 30 returns to step S101 and performs the same processing as the above-described processing after processing of step S112.

Through the above-described processing, map image display control by the image processing device 30 in the second embodiment is realized.

That is, a map image as illustrated in FIG. 10, FIG. 11, FIG. 12C, FIG. 12D, FIG. 13C, FIG. 13D, or the like is overlaid and displayed on a target region of a captured image at a timing at which a focus adjustment operation or an aperture adjustment operation is detected in the manual focus mode, and a timing at which start of a focus control operation or completion of focusing h the focus control operation is detected in the autofocus mode.

Hereinafter, a third embodiment of the present technology will be described with reference to FIG. 23.

The third embodiment is processing for realizing map image display control by the image processing device 30 and is an example in which a map image is displayed during recording of a captured moving image and the image processing device 30 performs display control depending on an output apparatus that outputs image data.

The output apparatus is an apparatus including the image processing device built therein and is, for example, an imaging device such as a digital still camera or a digital video camera. In addition, the output apparatus may be an external display apparatus that displays an image on the basis of an image signal output from an apparatus including the image processing device built therein.

Figure 22:
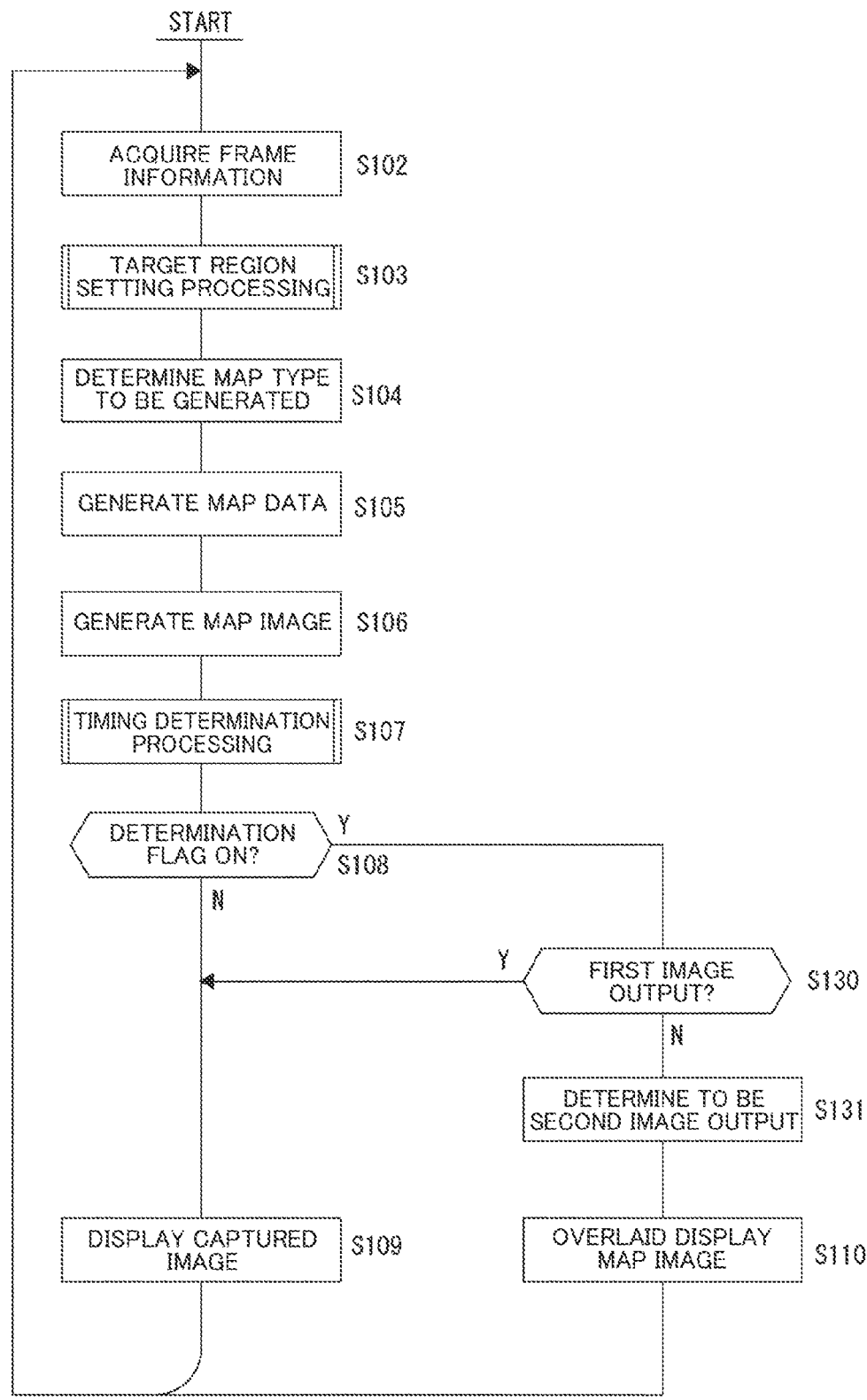
FIG. 22 is a flowchart of a processing example of a third embodiment.

In FIG. 22, the image processing device 30 acquires frame information from the imaging element unit 12 in step S102. Here, information as a through image is acquired as the frame information.

Then, the image processing device 30 performs target region setting processing of FIG. 19 to set a target region in a captured image in step S103.

The image processing device 30 performs determination of a map type to be generated in step S104 and generates map data corresponding to the determined map type in step S105. Then, the image processing device 30 generates a map image using the map data generated in step S106.

The image processing device 30 executes timing determination processing for determining a display timing of the map image in step S107.

Here, timing determination processing in FIG. 23 will be described.

The image processing device 30 determines whether the imaging device 1 is recording a captured image (captured moving image) in step S301. When the imaging device 1 is recording the captured image, the image processing device 30 sets a determination flag to ON in step S302 and ends processing of FIG. 23.

Figure 23:
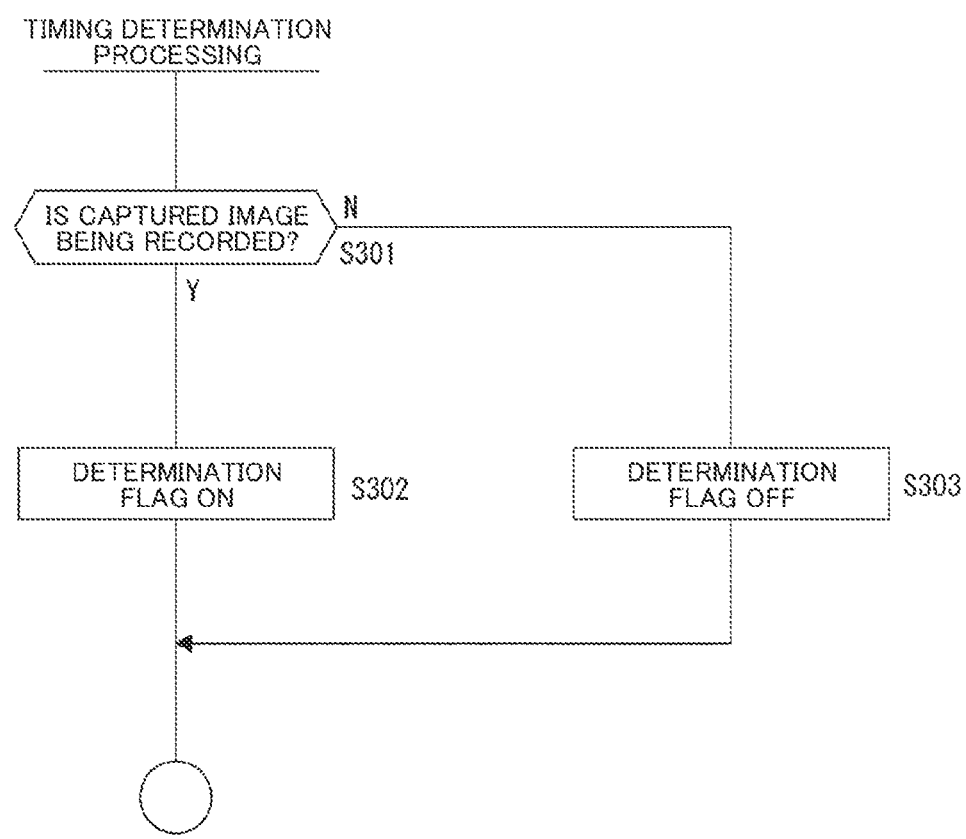
FIG. 23 is a flowchart of a processing example of the third embodiment.

In addition, the image processing device 30 proceeds with processing to step S303 from step S301 when the imaging device 1 is not recording the captured image, and when the determination flag is ON, sets the determination flag to OFF and ends processing of FIG. 23.

Referring back to FIG. 22, the image processing device 30 determines whether the determination flag is ON in step S103. When the determination flag is OFF, the image processing device 30 displays only the captured image without causing the map image to be overlaid and displayed on the captured image in step S109. Further, when the determination flag is ON in step S103, the image processing device 30 proceeds with processing to step S130.

The image processing device 30 proceeds with processing to step S109 to control display of only the captured image with respect to an output assumed to be a first image output in step S130.

Accordingly, display of only the captured image can be performed in, for example, an external display apparatus that has received the first image output and is connected to the imaging device 1.

In addition, with respect to a second image output different from the first image output, the image processing device 30 proceeds with processing in the order of steps S108, S130, S131, and S110 and causes the map image to be overlaid and displayed on the captured image in step S110.

Accordingly, the map image can be checked in, for example, the display unit of the imaging device 1 which has received the second image output.

The image processing device 30 returns processing to step S101 after step S109 or S110 and performs the same processing following step S701.

Through the above-described processing, map image display control by the image processing device 30 in the third embodiment is realized.

At the time of shooting a movie or the like, for example, overlaid display of a map image on a captured image is useful for a photographer performing shooting using the imaging device 1 in order to control the focus or aperture mechanism, but the map image may obstruct checking of the captured image for a director or the like who checks the captured image using an external monitor or the like connected to the imaging device 1.

Accordingly according to the example of the third embodiment, it is possible to perform display control differently for output apparatuses by performing a plurality of image outputs having different contents.

A fourth embodiment of the present technology will be described with reference to FIG. 24 and FIG. 25.

The fourth embodiment is processing performed by the image processing device to realize imaging operation control of a captured image using map data.

Figure 24:
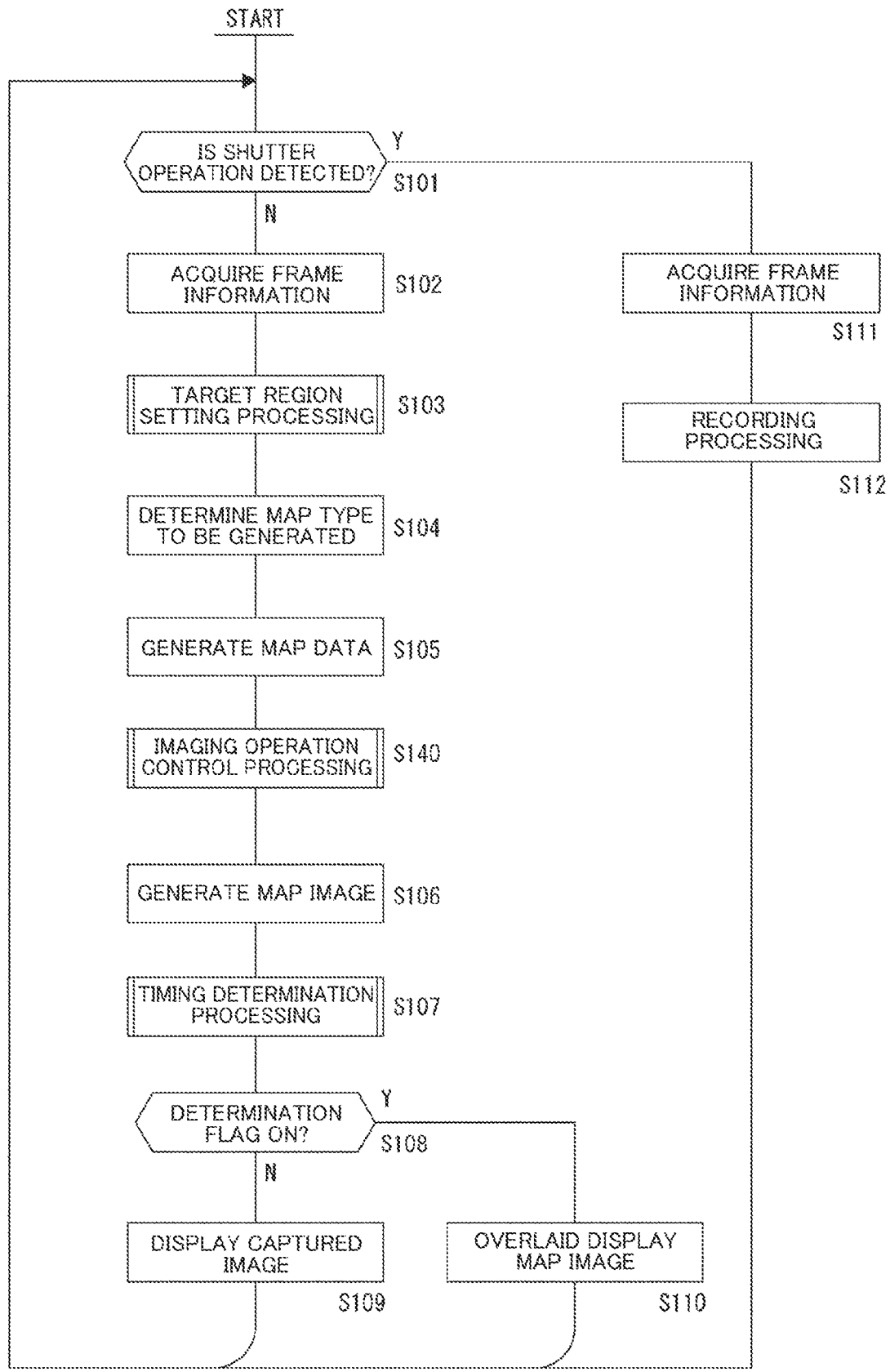
FIG. 24 is a flowchart of a processing example of a fourth embodiment.

In FIG. 24, the image processing device 30 proceeds with processing to step S102 to acquire frame information from the imaging element unit 12 when a shutter operation by a user is not detected in step S101. Then, the image processing device 30 performs target region setting processing of FIG. 19 to set a target region in a captured image in step S103.

The image processing device 30 performs determination of a map type to be generated in step S104 and generates map data corresponding to the determined map type in step S105.

Thereafter, the image processing device 30 performs imaging operation control processing in step S140.

Here, the details of the target region setting processing will be described with reference to FIG. 25.

The image processing device 30 sequentially determines whether a user operation for a defocus amount display icon is detected in step S401, whether a current mode is a face detection mode in step S404, and whether a current mode is a pupil detection mode in step S405.

Figure 25:
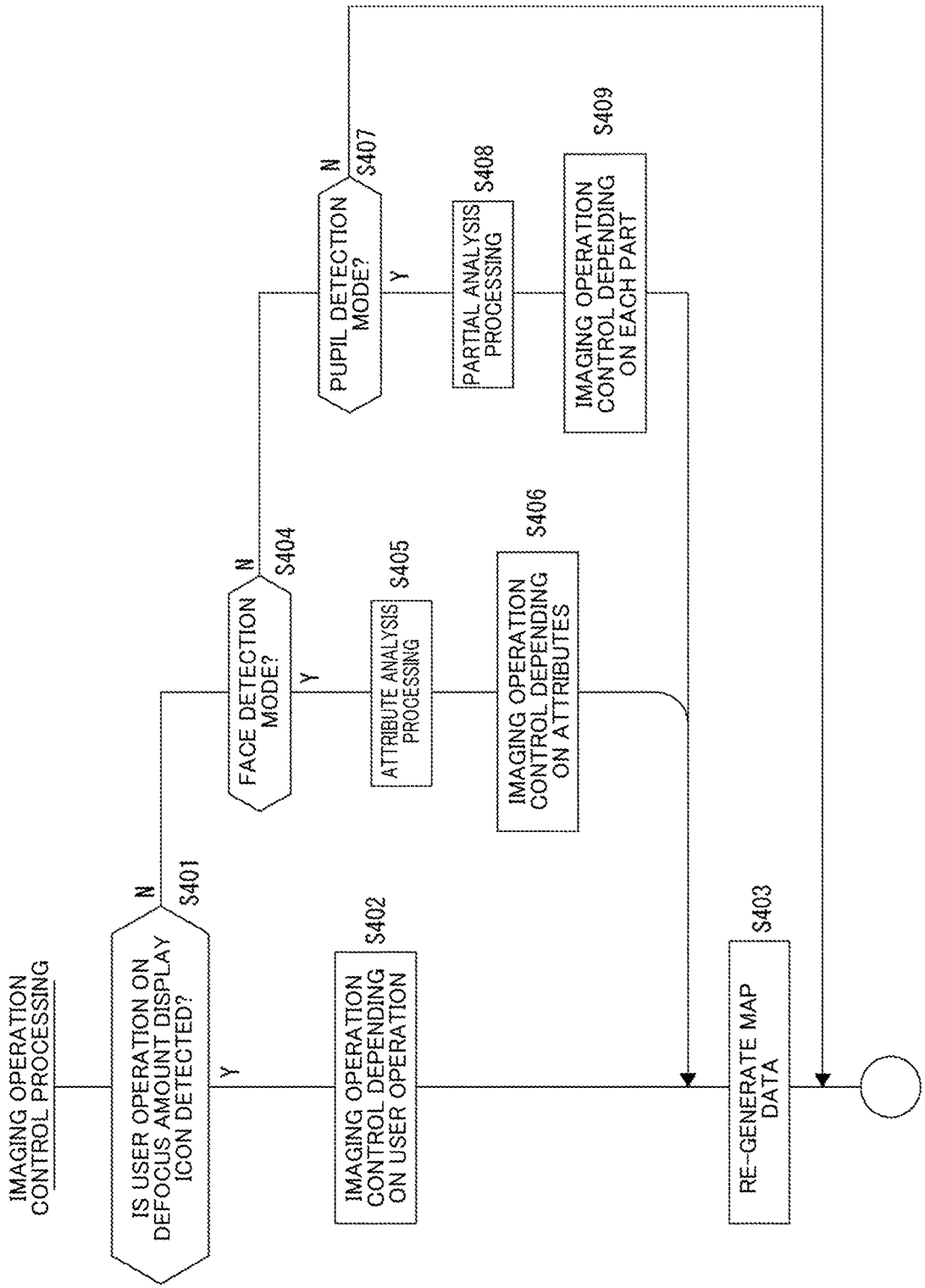
FIG. 25 is a flowchart of a processing example of the fourth embodiment.

If not in any of steps S401, S404, and S407, the image processing device 30 ends processing of FIG. 25 without performing imaging operation control.

When a user operation for the defocus amount display icon indicating a defocus amount of the target region is detected in step S401, the image processing device 30 proceeds with processing to step S402 to perform imaging operation control in response to the user operation.

The user operation for the defocus amount display icon is, for example, a pinch-in or pinch-out operation for changing the diameter of the annular icon BC, as illustrated in FIG. 14A. Otherwise, it is an operation of vertically sliding the arrow DF provided in the defocus meter 62, as illustrated in FIG. 14B.

The image processing device 30 controls operation of the focus lens or the aperture mechanism in response to an operation amount of the aforementioned user operation. Accordingly; it is possible to adjust a deviation amount (defocus amount) from a focusing position of the target region.

When imaging operation control ends, the image processing device 30 re-calculates a defocus amount using phase difference information or an imaging signal acquired from a position of the focus lens or a state of the aperture mechanism after the operation and generates defocus map data in step S403. The image processing device 30 generates a defocus map image from the generated defocus map data and generates depth map data from the defocus map data and lens information. Then, the image processing device 30 ends processing of FIG. 25.

In the case of the face detection mode in step S404, the image processing device 30 proceeds with processing to step S405 to perform attribute analysis processing on a face region detected from the captured image through image analysis processing. The image processing device 30 acquires attribute information of the detected face region through attribute analysis processing.

As the attribute information, various types of information such as information about attributes associated with the target region itself, such as the area of the target region, the percentage of the target region occupied in the captured image, and the position of the target region in the captured image, and attributes associated with subjects in the target region, such as the positions of the subjects, the number of persons, ages, genders, and sizes of face regions may be conceived.

Then, the image processing device 30 acquires fixed value information of the set defocus amount according to attribute information in step S406.

A fixed value may be a value set in advance according to attribute information of a target region or a value of each position may be set by the user. In addition, the fixed value may be set to a numerical value of a defocus amount at each position in the target region or may be a correction rate of the defocus amount at each position in the target region.

The image processing device 30 acquires defocus amount information at a plurality of positions in the target region using the defocus map data and performs operation control of the focus lens or the aperture mechanism of the lens system 11 such that the defocus amount information becomes a fixed value of the defocus amount at each position set in the target region.

Accordingly, a deviation amount (defocus amount) from the focusing position of the target region is adjusted. For example, it is possible to blur and display wrinkles of the face, as illustrated in FIG. 13, by increasing the absolute value of the defocus amount of the face region depending on gender and age.

When imaging operation control ends, the image processing device 30 re-generates defocus map data and depth map data using phase difference information or an imaging signal acquired from a position of the focus lens or a state of the aperture mechanism after the operation in step S403 and ends processing of FIG. 25.

In the case of the pupil detection mode in step S407, the image processing device 30 proceeds with processing to step S408 to perform partial analysis processing on a pupil region detected from the captured image through image analysis processing. The image processing device 30 detects, for example, an eyelash region through partial analysis processing.

Then, the image processing device 30 performs operation control of the focus lens or the aperture mechanism depending on the detected part in step S409. The image processing device 30 acquires fixed value information of a defocus amount at each position in the target region, which is associated with each part of the pupil region, for example, the eyelash region and performs operation control of the aperture mechanism such that the fixed value information becomes a fixed value of a defocus amount at each position set in the target region. Further, the image processing device 30 may control the focus lens of the lens system 11. Each part of the target region is, for example, an eyelash part or a part other than the eyelash part if the target region is a pupil region, or a nose part, an ear part, a mouse part, or the like if the target region is a face region, and is set depending on attributes of the target region.

When imaging operation control ends, the image processing device 30 re-generates defocus map data and depth map data using phase difference information or an imaging signal acquired from a position of the focus lens or a state of the aperture mechanism after the operation in step S403 and ends processing of FIG. 25.

Referring back to FIG. 24, the image processing device 30 generates a map image using the map data re-generated in step S403 of FIG. 25 in step S106.

The image processing device 30 executes timing determination processing for determining a map image display timing as described above, for example, in step S107, sets the determination flag to ON if it is the display timing, and sets the determination flag to OFF if it is not the display timing.

The image processing device 30 determines whether the determination flag is ON in step S108. When the determination flag is OFF, the image processing device 30 displays only the captured image without causing the map image to be overlaid and displayed on the captured image in step S109.

In addition, when the determination flag is ON in step S108, the image processing device 30 proceeds with processing to step S110 to cause the map image to be overlaid and displayed on the captured image.

The image processing device 30 returns to step S101 and checks detection of a shutter operation when processing of step S109 or step S110 ends.

When the shutter operation is detected in step S101, the image processing device 30 proceeds with processing to step S111 to acquire frame information of an imaging signal, a phase difference signal, or the like. At this time, when generated map data exists, the image processing device 30 also acquires the map data.

The image processing device 30 performs processing of recording the acquired frame information and the map data in step S112. The image processing device 30 returns to step S101 and performs the same processing as the above-described processing after processing of step S112.

Through the above-described processing, imaging operation control of a captured image using map data by the image processing device 30 in the fourth embodiment is realized.

By performing processing of steps S401 and S402 of FIG. 25, it is possible to control a defocus amount by changing the diameter of annular icons in an icon group with respect to an arbitrary region selected by the user, as illustrated in FIG. 15 and FIG. 16.

In addition, by performing processing of steps S404, S405, and S406, control of the defocus amount in the face region is automatically performed as illustrated in FIG. 12. Furthermore, by performing processing of steps S407, S408, and S409, control of the defocus amount of the eyelash part of the pupil region is automatically performed as illustrated in FIG. 13.

<5 Conclusion and Modified Examples>

The image processing device 30 mounted in the imaging device 1 of embodiments includes the map data generation unit 31 that generates defocus map data representing defocus amounts at a plurality of positions in a captured image obtained by the imaging element unit 12, calculated from phase difference information detected by image surface phase difference pixels (phase difference detection unit 22) in the imaging element unit 12, and the display control unit 32 that generates a defocus map image representing a distribution of defocus amounts of the captured image using the defocus map data generated by the map data generation unit 31 and performs display control (FIG. 18).

Accordingly, the distribution of the defocus amounts at the plurality of positions in the captured image is displayed as the defocus map image.

Therefore, a user can recognize the distribution of the defocus amounts as a plane region corresponding to the plurality of positions in the captured image instead of point positions such as focusing positions. That is, the user can ascertain a distribution of defocus amounts with respect to the whole captured image and thus can adjust a defocus amount at each position in the captured image while considering defocus amounts of other regions.

In the image processing device 30 of the embodiments, the map data generation unit 31 generates defocus map data of a plurality of positions in a target region set in the captured image and the display control unit 32 generates a defocus map image with respect to the target region (S103 of FIG. 18).

Accordingly, a distribution of defocus amounts at the plurality of positions in the target region of the captured image is displayed as the defocus map image.

For example, when the user wants to blur a face of a subject in imaging, the user wants to know a distribution of defocus amounts at positions in a face region of the subject. Accordingly, it is possible to perform display with narrowed points in which the intention of the user is reflected by selecting various target regions according to the purpose of the user and displaying a distribution of defocus amounts with respect to the selected target regions.

In addition, since it is not necessary to display a defocus map image with respect to the whole captured image, a processing load of the image processing device 30 for generating defocus map data and a defocus map image can be reduced. Further, the aforementioned effects can also be obtained when the image processing device 30 generates depth map data of a plurality of positions in a target region set in the captured image and generates a depth map image with respect to the target region.

In the image processing device 30 of the embodiments, the map data generation unit 31 calculates subject distances at a plurality of positions in the captured image obtained by the imaging element unit 12 on the basis of the calculated defocus amounts and generates depth map data representing the calculated subject distances, and the display control unit 32 generates a depth map image representing a distribution of the subject distances in the captured image using the depth map data generated by the map data generation unit 31 and performs display control (S105 and S106 of FIG. 18).

Accordingly the distribution of the subject distances in the captured image is displayed as the depth map image. In addition, the depth map image and the defocus map image may be switchably displayed.

Accordingly the user can recognize a subject distance at each position in a plane region corresponding to the captured image through the depth map image. Therefore, the user can consider subject distances of the whole captured image and then control a depth of field.

In addition, since the depth map image and the defocus map image can be switched each other, it is possible to select a map image display mode according to purpose in such a manner that the depth map image is caused to be displayed at the time of adjusting a depth of field in consideration of subject distances of the captured image and the defocus map image is caused to be displayed at the time of adjusting focus control in consideration of a defocus amount at each position in the captured image.

In the image processing device 30 of the embodiments, the display control unit 32 generates a defocus map image colored depending on the defocus amounts at the respective positions in the captured image (FIG. 10 and FIG. 11).

Accordingly, a defocus amount value difference at each position in the captured image is displayed as a color difference in the defocus map image.

Therefore, it is possible to visually and intuitively easily ascertain a distribution of defocus amounts in the captured image (target region) by displaying a defocus amount value difference at each position in the captured image (target region) as a color.

In addition, at the time of changing a defocus amount at a certain position in the captured image (target region), it is also possible to visually easily recognize whether the image is changing toward a focusing position or is changing to front blur or rear blur by checking change in the color of the position.

Accordingly, it is possible to intuitively easily adjust blurring of a subject in a captured screen on the basis of display of the corresponding color.

In the image processing device 30 of the embodiments, the display control unit 32 generates a defocus map image using a defocus amount display icon having different display modes in response to defocus amounts (FIG. 14 to FIG. 17).

Accordingly a distribution of defocus amounts at positions corresponding to respective defocus amount display icons is displayed in display modes of the defocus amount display icons in the defocus map image.

Therefore, it is possible to visually and intuitively easily ascertain a distribution of defocus amounts in the captured image (target region) by displaying a defocus amount value difference at each position in the captured image (target region) as a display mode difference between defocus amount display icons.

In the image processing device 30 of the embodiments, the defocus amount display icon is formed in an annular shape (annular icon BC) and the diameter of the defocus amount display icon is changed in response to a defocus amount (FIG. 14 to FIG. 17).

Accordingly annular icons BC having different diameters in response to defocus amounts as illustrated in FIG. 14B are displayed. It is possible to intuitively recognize a defocus amount by the size of the annular icon BC because the diameter thereof changes in response to a defocus amount.

In the image processing device 30 of the embodiments, the display control unit 32 performs control of causing a defocus map image to be displayed upon start of a focus control operation in the autofocus mode (S320 of FIG. 21).

Accordingly defocus map data is generated on the basis of a defocus amount at each position which has changed according to the focus control operation, and a defocus map image using the generated defocus map data is displayed.

Therefore, it is possible to check change in the defocus map image during focus control.

In the image processing device 30 of the embodiments, the display control unit 32 performs control of causing a defocus map image to be displayed upon switching to a focused state by a focus control operation in the autofocus mode (S321 of FIG. 21).

Accordingly distributions of defocus amounts at a focusing position and in a region other than the focusing position are displayed as the defocus map image. Therefore, it is possible to visually easily check a distribution of defocus amounts in the captured image in the focused state. In addition, even in a case in which a subject is switched to a focused state by the focus control operation in the autofocus mode and then a focusing position in the subject is intended to be slightly deviated by a manual operation, it is possible to perform a fine defocus amount adjustment operation in consideration of a distribution of defocus amounts of the whole captured image or a part thereof in the focused state.

In the image processing device 30 of the embodiments, the display control unit 32 performs control of causing a defocus map image to be displayed upon detection of a focus adjustment operation or an aperture adjustment operation by a user in the manual focus mode (S314 and S315 of FIG. 21).

Accordingly, the focus adjustment operation or the aperture adjustment operation by the user is performed in a state in which the defocus map image representing a distribution of defocus amounts in the captured image is displayed.

Therefore, the user can perform the focus adjustment operation or the aperture adjustment operation while intuitively checking change in the defocus amount at each position in the captured image, and thus a fine defocus amount adjustment operation in consideration of a distribution of defocus amounts of a target region can be performed.

In the image processing device 30 of the embodiments, the display control unit 32 performs control of causing a defocus map image to be displayed upon start of recording of a captured image (S301 and S302 of FIG. 23).

Accordingly change in a distribution of defocus amounts of the captured image during recording of the captured image (captured moving image) is displayed by the defocus map image.

Therefore, the user can record the captured moving image while considering a distribution of defocus amounts of a whole target region. Accordingly, it is possible to perform a fine defocus amount adjustment operation in consideration of the distribution of the defocus amounts of the target region even during recording of the captured moving image.

In the image processing device 30 of the embodiments, the first image output for causing a captured image to be displayed without displaying a defocus map image and the second image output for causing the captured image including display of the defocus map image to be displayed are performed (S130 and S131 of FIG. 22).

Accordingly; the defocus map image is not display on an output apparatus that has received the first image output and the defocus map image is displayed on an output apparatus that has received the second image output.

At the time of shooting a movie or the like, for example, overlaid display of a map image on a captured image is useful for a photographer performing shooting using the imaging device 1 in which the image processing device 30 is mounted in order to control focus or the aperture mechanism, whereas the map image may obstruct checking of the captured image for a director or the like who checks the captured image using an external monitor or the like connected to the imaging device 1. Accordingly, it is possible to perform display control differently for output apparatuses for different purposes of users by performing a plurality of image outputs having different contents.

In the image processing device 30 of the embodiments, the display control unit 32 ends display control of a defocus map image after the elapse of a predetermined time from start of display control of the defocus map image (S123 and S124 of FIG. 20).

Accordingly display control of the defocus map image ends without causing display control of the defocus map image to end by a user operation.

Accordingly, the defocus map image is not displayed for a period longer than necessary when the user views the defocus map image, and thus switching from the defocus map image to the captured image can be comfortably performed.

In addition, it is possible to perform switching from the defocus map image to the captured image more comfortably by setting a display time suitable for each trigger to display the defocus map image, such as setting the display time to 30 seconds when any of a focus adjustment operation and an aperture adjustment operation is detected in the manual focus mode and setting a timer to 1 minute from completion of focusing by a focus control operation in the autofocus mode.

In the image processing device 30 of the embodiments, the target region setting unit 33 that sets a region in the captured image, designated by a user operation, as a target region is included (S201 and S205 of FIG. 19).

Accordingly a defocus map image is displayed in the region in the captured image designated by the user operation. Therefore, it is possible to easily cause the defocus map image to be displayed with respect to the target region in which the user wants to check a distribution of defocus amounts.

In the image processing device 30 of the embodiments, the target region setting unit 33 that sets a target region depending on the contents of a captured image is included (S202 and S203 of FIG. 19).

Accordingly, a defocus map image is displayed in the target region depending on the contents of the captured image. Therefore, it is possible to perform display with narrowed points in which a purpose of the user has been reflected by causing a distribution of defocus amounts with respect to the target region depending on the purpose of the user to be displayed.

In the image processing device 30 of the embodiments, the target region setting unit 33 sets a face region detected in a captured image as a target region (S202 of FIG. 19).

Accordingly, a defocus map image is displayed in the face region in the captured image. When wrinkles, spots, and the like in the face region relatively stand out, the face region can be blurred by slightly deviating a focusing position from the face region, but visually checking how much the face region will be blurred at this time is useful for the user.

In the image processing device 30 of the embodiments, the target region setting unit 33 sets a pupil region detected in a captured image as a target region (S203 of FIG. 19).

Accordingly, a defocus map image is displayed in the pupil region in the captured image. A difference between defocus amounts of an eyelash part and other regions in the pupil region can be visually easily checked through the defocus map image.

In the image processing device 30 of the embodiments, the recording control unit 35 that records defocus map data generated by the map data generation unit 31 as additional information for a captured image is included (S112 of FIG. 18). Accordingly, defocus amount information at each position in the captured image is recorded as metadata of the captured image. Therefore, it is possible to cause the defocus map image to be overlaid and displayed on the captured image even when the user views the captured image later.

A program of an embodiment is a program causing, for example, a CPU, a DSP or a device including these to execute processing illustrated in FIG. 18 to FIG. 25. That is, the program of the embodiment is a program causing the image processing device to execute a map data generation function of generating defocus map data representing defocus amounts at a plurality of positions in a captured image obtained by the imaging element unit, calculated from phase difference information detected by the phase difference detection unit, and a display control function of generating a defocus map image representing a distribution of defocus amounts of the captured image using the defocus map data generated by the map data generation function and performing display control. With such a program, the aforementioned image processing device 30 can be realized in an apparatus such as the mobile terminal 2, the personal computer 3, or the imaging device 1.

Such a program can be recorded in advance in an HDD as a recording medium built in an apparatus such as a computer device, a ROM in a microcomputer including a CPU, or the like.

Alternatively, the program can be temporarily or permanently stored (recorded) in a removable recording medium such as a flexible disc, a compact disc read only memory (CD-ROM), a magnet optical (MO) disc, a digital versatile disc (DVD), a Blu-ray Disc (registered trademark), a magnetic disk, a semiconductor memory, or a memory card. Such a removable recording medium can be provided as so-called package software.

Further, such a program can be installed in a personal computer or the like from the removable recording medium, and can also be downloaded from a download site via a network such as a local area network (LAN) or the Internet.

Further, such a program is suitable for a wide range of provision of the image processing device of the embodiments. For example, a program is downloaded to a personal computer, a portable information processing device, a mobile phone, a game device, a video device, a personal digital assistant (PDA), or the like, making it possible for the personal computer or the like to function as the image processing device of the present disclosure.

Meanwhile, the advantages effects described in the present specification are merely illustrative not restrictive and other advantages effects may be obtained.

The present technology can be configured as follows.

(1)

An image processing device including:
  a map data generation unit configured to generate defocus map data representing defocus amounts at a plurality of positions in a captured image obtained by an imaging element unit, calculated from phase difference information detected by a phase difference detection unit, and
  a display control unit configured to generate a defocus map image representing a distribution of defocus amounts of the captured image using the defocus map data generated by the map data generation unit and to perform display control.

(2)

The image processing device according to (1), wherein the phase difference detection unit detects the phase difference information using image surface phase difference pixels in the imaging element unit.

(3)

The image processing device according to (1) or (2), wherein the map data generation unit generates defocus map data of a plurality of positions in a target region set in the captured image, and
  the display control unit generates a defocus map image with respect to the target region.

(4)

The image processing device according to any one of (1) to (3), wherein the map data generation unit calculates subject distances at a plurality of positions in the captured image obtained by the imaging element unit on the basis of the calculated defocus amounts and generates depth map data representing the calculated subject distances, and
  the display control unit generates a depth map image representing a distribution of the subject distances in the captured image using the depth map data generated by the map data generation unit and performs display control.

(5)

The image processing device according to any one of (1) to (4), wherein the display control unit generates a defocus map image colored depending on the defocus amounts at, the respective positions in the captured image.

(6)

The image processing device according to any one of (1) to (5), wherein the display control unit generates a defocus map image using a defocus amount display icon having different display modes in response to defocus amounts.

(7)

The image processing device according to (6), wherein the defocus amount display icon is formed in an annular shape and the diameter of the defocus amount display icon is changed in response to a defocus amount.

(8)

The image processing device according to any one of (1) to (7), wherein the display control unit performs control of causing the defocus map image to be displayed upon switching to a focused state by a focus control operation in an autofocus mode.

(9)

The image processing device according to any one of (1) to (8), wherein the display control unit performs control of causing the defocus map image to be displayed upon detection of a focus adjustment operation or an aperture adjustment operation by a user in a manual focus mode.

(10)

The image processing device according to any one of (1) to (9), wherein the display control unit performs control of causing the defocus map image to be displayed upon start of recording of the captured image.

(11)

The image processing device according to any one of (1) to (10), wherein a first image output causing the captured image to be displayed without displaying the defocus map image and a second image output causing the captured image including the defocus map image to be displayed are performed.

(12)

The image processing device according to any one of (1) to (11), wherein the display control unit ends display control of the defocus map image after the elapse of a predetermined time from start of display control of the defocus map image.

(13)

The image processing device according to any one of (3) to (12), including a target region setting unit configured to set a region in the captured image, designated by a user operation, as the target region.

(14)

The image processing device according to any one of (3) to (12), including a target region setting unit configured to set the target region depending on contents of the captured image.

(15)

The image processing device according to (14), wherein the target region setting unit sets a face region detected in the captured image as the target region.

(16)

The image processing device according to (14), wherein the target region setting unit sets a pupil region detected in the captured image as the target region.

(17)

The image processing device according to any one of (1) to (16), including a recording control unit configured to record the defocus map data generated by the map data generation unit as additional information for the captured image.

(18)

The image processing device according to any one of (1) to (17), wherein the display control unit performs control of causing the defocus map image to be displayed upon start of a focus control operation in an autofocus mode.

(19)

An image processing method including generating defocus map data representing defocus amounts at a plurality of positions in a captured image obtained by an imaging element unit, calculated from phase difference information detected by a phase difference detection unit, and generating a defocus map image representing a distribution of defocus amounts of the captured image using the generated defocus map data and performing display control.

(20)

A program causing an image processing device to execute a map data generation function of generating defocus map data representing defocus amounts at a plurality of positions in a captured image obtained by an imaging element unit, calculated from phase difference information detected by a phase difference detection unit, and a display control function of generating a defocus map image representing a distribution of defocus amounts of the captured image using the defocus map data generated by the map data generation function and performing display control.

(21)

An imaging device including:

an imaging element unit configured to perform image capturing;

a map data generation unit configured to generate defocus map data representing defocus amounts at a plurality of positions in a captured image obtained by the imaging element unit, calculated from phase difference information detected by a phase difference detection unit; and a display control unit configured to generate a defocus map image representing a distribution of defocus amounts of the captured image using the defocus map data generated by the map data generation unit and to perform display control.

REFERENCE SIGNS LIST

1 Imaging device
12 Imaging element unit
22 Phase difference detection unit
30 Image processing device
31 Map data generation unit
32 Display control unit
33 Target region setting unit
34 Operation control unit
35 Recording control unit

The invention claimed is:

1. An image processing device comprising:
a map data generator configured to
generate defocus map data representing defocus amounts at a plurality of positions in a captured image obtained by an imaging element, calculated from phase difference information detected by a phase difference detector,
calculate subject distances at a plurality of positions in the captured image obtained by the imaging element on the basis of the calculated defocus amounts, and
generate depth map data representing the calculated subject distances; and a display controller configured to
generate a defocus map image representing a distribution of defocus amounts of the captured image using the defocus map data generated by the map data generator,
perform display control, generate a depth map image representing a distribution of the subject distances in the captured image using the depth map data generated by the map data generator, and perform overlaid display of the depth map image with respect to the captured image at a predetermined timing, wherein the defocus map image includes a plurality of defocus amount display icons having different display modes that respectively correlate to different defocus amounts, the plurality of defocus amount display icons are displayed at a plurality of positions in a target region of the captured image, the target region corresponding to a subject of the captured image, and the plurality of defocus amount display icons respectively have different sizes corresponding to the different display modes.

2. The image processing device according to claim 1, wherein the phase difference detector detects the phase difference information using image surface phase difference pixels in the imaging element.

3. The image processing device according to claim 1, wherein the map data generator generates defocus map data of a plurality of positions in a target region set in the captured image, and the display controller generates a defocus map image with respect to the target region.

4. The image processing device according to claim 3, comprising a target region setter configured to set a region in the captured image, designated by a user operation, as the target region.

5. The image processing device according to claim 3, comprising a target region setter configured to set the target region depending on contents of the captured image.

6. The image processing device according to claim 5, wherein the target region setter sets a face region detected in the captured image as the target region.

7. The image processing device according to claim 5, wherein the target region setter sets a pupil region detected in the captured image as the target region.

8. The image processing device according to claim 1, wherein the display controller generates a defocus map image colored depending on the defocus amounts at the respective positions in the captured image.

9. The image processing device according to claim 1, wherein each defocus amount display icon is formed in an annular shape and the diameter of each defocus amount display icon is changed in response to a defocus amount.

10. The image processing device according to claim 1, wherein the display controller performs control of causing the defocus map image to be displayed upon switching to a focused state by a focus control operation in an autofocus mode.

11. The image processing device according to claim 1, wherein the display controller performs control of causing the defocus map image to be displayed upon detection of a focus adjustment operation or an aperture adjustment operation by a user in a manual focus mode.

12. The image processing device according to claim 1, wherein the display controller performs control of causing the defocus map image to be displayed upon start of recording of the captured image.

13. The image processing device according to claim 1, wherein a first image output causing the captured image to be displayed without displaying the defocus map image and a second image output causing the captured image including the defocus map image to be displayed are performed.

14. The image processing device according to claim 1, wherein the display controller ends display control of the defocus map image after the elapse of a predetermined time from start of display control of the defocus map image.

15. The image processing device according to claim 1, comprising a recording controller configured to record the defocus map data generated by the map data generator as additional information for the captured image.

16. An image processing method comprising:

generating defocus map data representing defocus amounts at a plurality of positions in a captured image obtained by an imaging element, calculated from phase difference information detected by a phase difference detector;

generating a defocus map image representing a distribution of defocus amounts of the captured image using the generated defocus map data and performing display control;

calculating subject distances at a plurality of positions in the captured image obtained by the imaging element on the basis of the calculated defocus amounts;

generating depth map data representing the calculated subject distances;

generating a depth map image representing a distribution of the subject distances in the captured image using the depth map data; and performing overlaid display of the depth map image with respect to the captured image at a predetermined timing, wherein the defocus map image includes a plurality of defocus amount display icons having different display modes that respectively correlate to defocus amounts, the plurality of defocus amount display icons are displayed at a plurality of positions in a target region of the captured image, the target region corresponding to a subject of the captured image, and the plurality of defocus amount display icons respectively have different sizes corresponding to the different display modes.

17. A non-transitory computer-readable medium storing a program, the program being executable by a processor to perform operations comprising:

generating defocus map data representing defocus amounts at a plurality of positions in a captured image obtained by an imaging element, calculated from phase difference information detected by a phase difference detector;

generating a defocus map image representing a distribution of defocus amounts of the captured image using the generated defocus map data and performing display control;

calculating subject distances at a plurality of positions in the captured image obtained by the imaging element on the basis of the calculated defocus amounts;

generating depth map data representing the calculated subject distances;

generating a depth map image representing a distribution of the subject distances in the captured image using the depth map data; and performing overlaid display of the depth map image with respect to the captured image at a predetermined timing, wherein the defocus map image includes a plurality of defocus amount display icons having different display modes in response to defocus amounts, the plurality of defocus amount display icons are displayed at a plurality of positions in a target region of the captured image, the target region corresponding to a subject of the captured image, and the plurality of defocus amount display icons respectively have different sizes corresponding to the different display modes.

18. An imaging device comprising:

an imaging element configured to perform image capturing;

a memory configured to store a program; and a processor configured to execute the program to perform operations comprising:

generating defocus map data representing defocus amounts at a plurality of positions in a captured image obtained by an imaging element, calculated from phase difference information detected by a phase difference detector;

generating a defocus map image representing a distribution of defocus amounts of the captured image using the generated defocus map data and performing display control;

calculating subject distances at a plurality of positions in the captured image obtained by the imaging element on the basis of the calculated defocus amounts;

generating depth map data representing the calculated subject distances;

generating a depth map image representing a distribution of the subject distances in the captured image using the depth map data; and performing overlaid display of the depth map image with respect to the captured image at a predetermined timing, wherein the defocus map image includes a plurality of defocus amount display icons having different display modes in response to defocus amounts, the plurality of defocus amount display icons are displayed at a plurality of positions in a target region of the captured image, the target region corresponding to a subject of the captured image, and the plurality of defocus amount display icons respectively have different sizes corresponding to the different display modes.

* * * * *